United States Patent [19]

Jones, Jr.

[11] 4,162,492

[45] Jul. 24, 1979

[54] METHOD AND APPARATUS FOR IMAGE SIGNAL GENERATION AND IMAGE DISPLAY

[75] Inventor: Robert E. Jones, Jr., Timonium, Md.

[73] Assignee: AAI Corporation, Cockeysville, Md.

[21] Appl. No.: 283,673

[22] Filed: Aug. 25, 1972

[51] Int. Cl.² ............................................. G06F 3/14
[52] U.S. Cl. .................................. 340/723; 340/732; 340/789
[58] Field of Search ..................... 315/18, 19, 22, 23, 315/24, 27, 365, 391–395, 382; 340/324 A, 324 AD; 178/7.5 R; 358/22, 104, 160; 364/855; 35/12 N; 273/DIG. 28

[56] References Cited

U.S. PATENT DOCUMENTS

| | | | |
|---|---|---|---|
| 2,953,679 | 9/1960 | Rush et al. | 315/398 |
| 3,093,822 | 6/1963 | Balding | 343/11 |
| 3,364,382 | 1/1968 | Harrison | 315/18 |
| 3,422,419 | 1/1969 | Mathews et al. | 340/324 A |
| 3,454,822 | 7/1969 | Harrison | 315/18 |
| 3,459,932 | 8/1969 | Huey et al. | 364/855 |
| 3,605,083 | 9/1971 | Kramer | 340/27 NA |
| 3,624,524 | 11/1971 | Bryden | 364/855 |
| 3,711,849 | 1/1973 | Hasenbalg | 315/18 |

OTHER PUBLICATIONS

*Encyclopedia on Cathode-Ray Oscilloscopes and Their Uses*, Rider et al., John F. Rider Publisher, Inc., New York City, pp. 438, 443, 444.

*Primary Examiner*—Theodore M. Blum
*Attorney, Agent, or Firm*—Reginald F. Pippin, Jr.

[57] ABSTRACT

Method and apparatus for generating image-forming envelope and other wave forms for image display of an area or an object whose image is desired to be simulated. The image-forming envelope wave forms for complex objects and complex area silhouettes are formed as composites of component areas forming the silhouette outline to be imaged in signal form and displayed. Object attitude variations, range variations, and observer-to-object geometry is accommodated.

66 Claims, 15 Drawing Figures

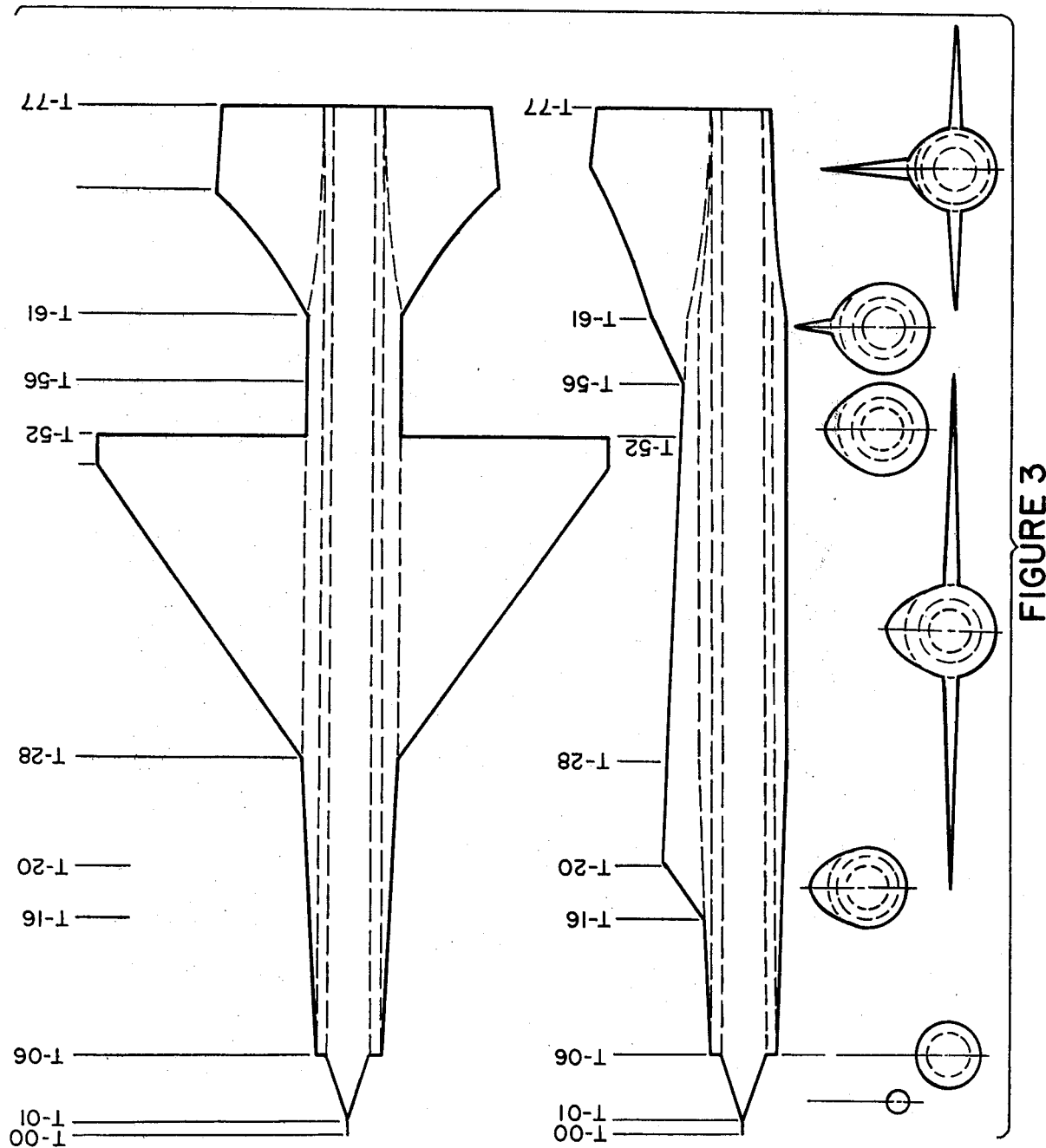

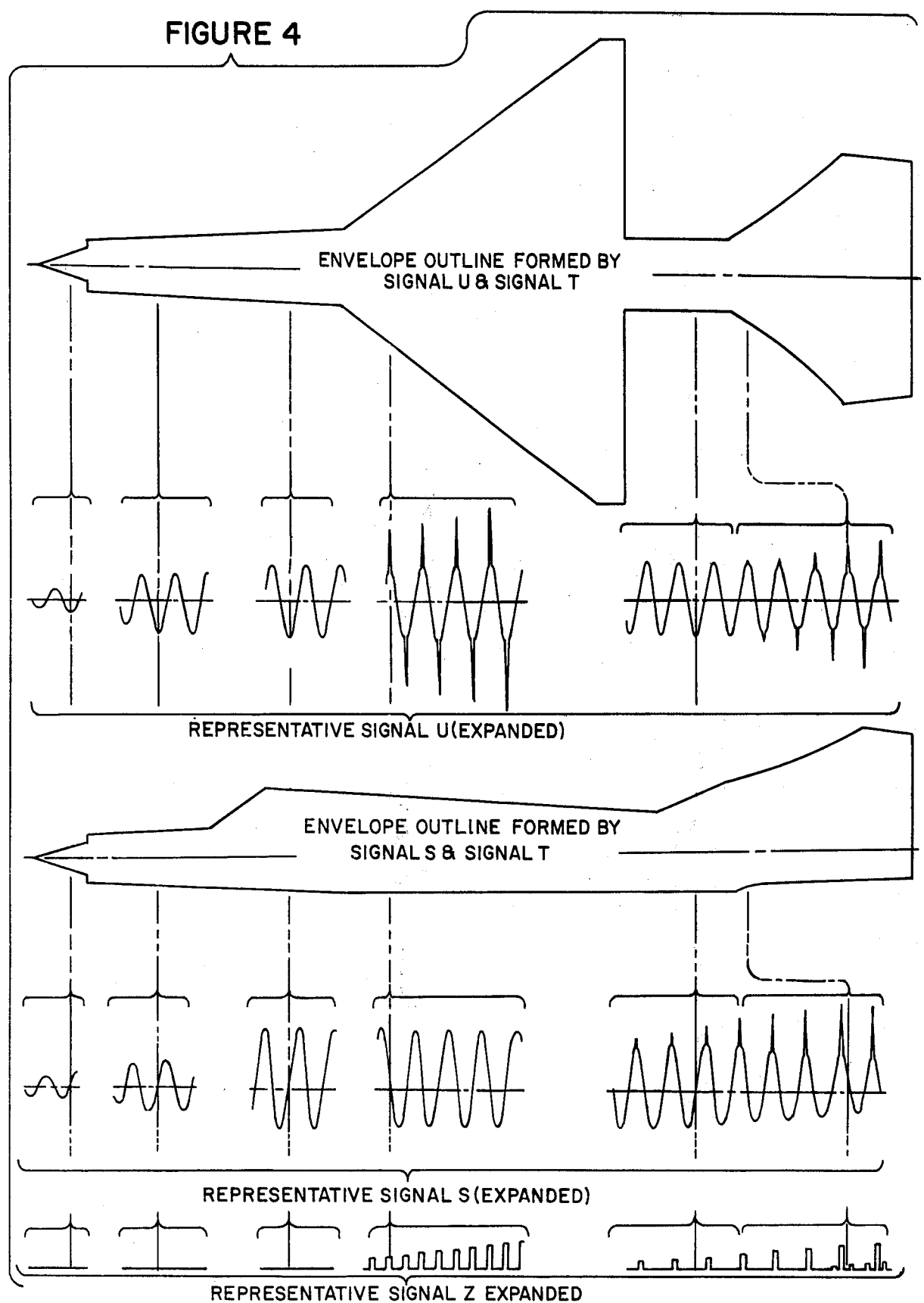

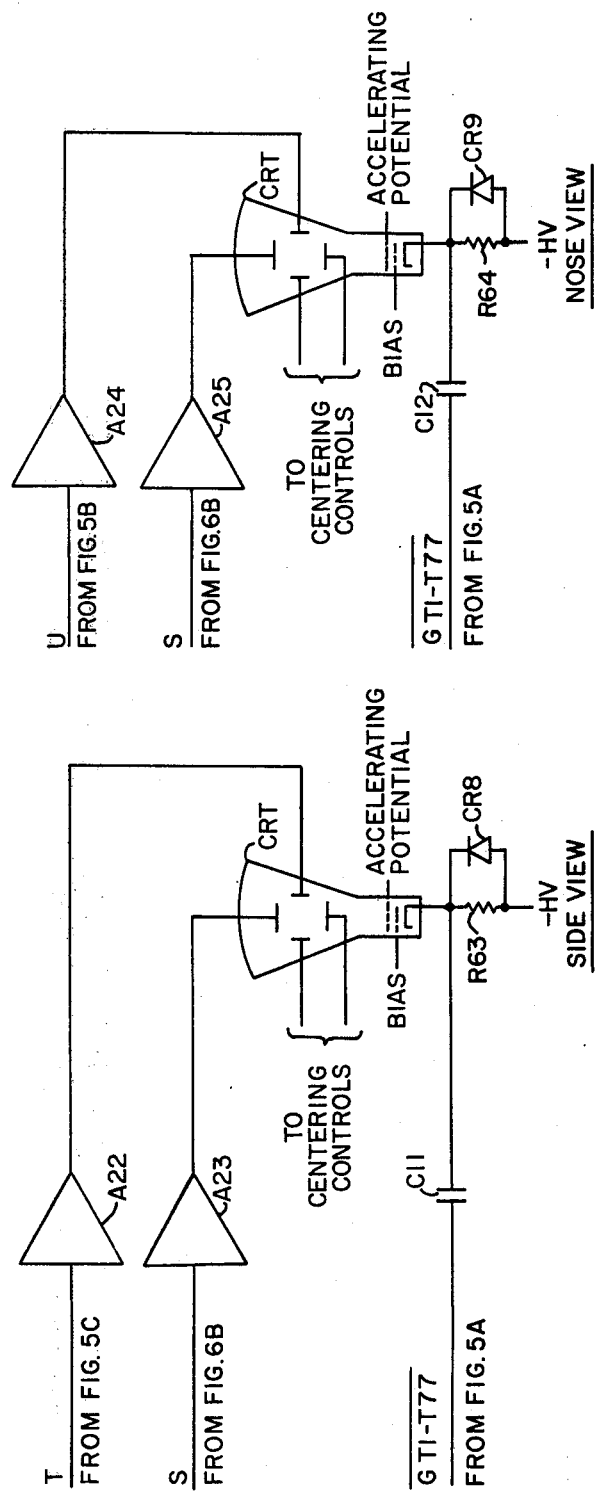

METHOD AND APPARATUS FOR IMAGE SIGNAL GENERATION AND IMAGE DISPLAY

This invention relates to a method and apparatus for image signal generation, and for image display of artificially generating simulated images of areas and objects, and particularly artificially analog-generated simulated images which are capable of electronic trace display, and which do not require an actual object or model or area to enable formation of the imaging analog signals for image simulation thereof.

Visual image generation systems of the type just indicated are required in a large variety of training and simulation devices. A desirable attribute of such devices is the ability to present various attitudes and variations in size of an object and to illustrate motion of the object, for simple viewing and/or action or reaction in response thereto. A wide variety of devices have been used for this purpose. Photographic projection techniques utilizing slides or motion pictures or prerecorded video tape are the mainstay for visual image generation. The use of a model oriented by a gantry or gimbaled mount viewed directly or with a television camera has also been used. Digital computer-generated images describing the image in a series of straight line segments are being used extensively today. Analog graphic techniques similar to digital computer graphic techniques are also used.

The various visual image generation techniques just described have one or more deficiencies which become particularly evident when utilized in a system interacting with the user in his normal environment. the primary deficiency of the photographic and prerecorded video tape techniques being the lack of interaction and/or limited response available to the observer due to the "canned" nature of the presentation. The use of a model viewed directly or with a television camera results in distractions due to structural visual interference (model mount, gimbal or gantry). Digital computer-generated images require large amounts of memory and generally a fast computer to avoid image flicker. Although digital computer-generated images resolve the aforementioned technique's shortcoming it represents an overly large expensive solution to the problem. Some analog graphic arrangements appear to be available, but such appear to be quite limited in stimulation capability and are apparently limited to only simple regular or symmetrical objects, such as cubes, cylinders and cones.

A feature of the present invention is the generation of a two-dimensional display of an area or areas desired to be displayed, and particularly the area or areas of a three-dimensional object or objects without the objections and disadvantages described above.

A further feature of the present invention is to reduce the cost and complexity of visual image generation systems that permit user interaction.

The invention described herein embodies a unique analog method of forming and compositing analog envelope-forming image-representative signals representative of various areas, and is not limited only to regular or symmetrical objects such as cubes, cylinders or cones, but is capable of effecting imaging and/or visual display of various irregular and assymetrical objects and/or areas desired to be imaged and/or visually displayed.

Another feature of the present invention is the provision of an all-electronic arrangement for performing Eulerian rotations of an image having six degrees of freedom (roll, yaw, pitch, azimuth, elevation and range).

In generating and presenting a two-dimensional silhouette image of a two-dimensional or three-dimensional object, most of the present-day technology uses photographic or television techniques which are restrictive by way of either or all of versatility, portability or fragility, and the requirement for the object or a model thereof. It is a further feature of this invention to provide a unique method and apparatus for generating image-representative signals representative of, and for presenting a two-dimensional image of, a two-dimensional or three-dimensional, object without the restrictions.

It is still another feature of this invention to provide an imaging method, and an arrangement embodying such method enabling simulated imaging and display in two dimensions of complex areas, including areas formed by three-dimensional objects without necessity for forming an image directly or indirectly from or with the area or object desired to be imaged.

It is a further feature to provide an imaging method, and an arrangement embodying such method, enabling analog image wave form simulation of complex areas desired to be imaged, through lissajous signals formed by time ramp scanning in conjunction with a composite envelope-forming AC wave form or wave forms formed by combining multiple wave form signals representative of various component areas of the area desired to be imaged in simulation.

Another feature of the invention is to provide a method, and an arrangement embodying such method, enabling the imaging and display through use of lissajous figures of the simulated outline configuration of areas and objects having various complex areas, by formation of lissajous-forming imaging signals for given area outlines from signals representative of sub areas within the area represented by the resultant lissajous-forming imaging signals.

Still a further feature resides in the provision of a method and apparatus enabling lissojous imaging of a complex silhouette object though addtion of component-area-representative signals representative of component zones of an object, and which enables infinite variation of attitude presentation of the object by the simulated image.

Still another feature resides in the formation of a composite lissajous image which may be varied in attitude to reflect the two-dimensional silhouette variation in attitude of a complex silhouette object being simulated.

A further feature resides in the formation of a lissajous imaged display which may be varied in attitudes of display of an object as seen by an observer at a given spatial location, and may be varied in size as a function of range.

Another feature is the provision of a method and apparatus for imaging and display of silhouettes of objects, and enabling compensation for loss of trace intensity in high-speed traces.

Still other objects, features and attendant advantages will become apparent from a reading of the following detailed description of an illustrative and preferred method and embodiment according to the invention, taken in conjunction with the accompanying drawings, wherein.

FIG. 3 is a silhouette outline illustration of the plan (top and bottom plan view silhouettes outlines are identical) and side views of an artificially generated aircraft image according to the invention, and also showing front view illustrations of the respective outline traces of the simulated aircraft image at various different longitudinal positions along the length of the simulated aircraft image, the frontal and rear views of the aircraft being a composite of the frontal view outline traces at all trace positions along the length of the aircraft image. In addition, in FIG. 3, component areas forming the composite image signal and silhouette area are indicated in broken lines within the composite complex image outline in each of the views. Such broken lined demarcations are shown only for additional clarification of image compositing, and do not form corresponding visible lines in the displayed image.

FIG. 4 is an illustration of the side and plan view image outlines of a simulated aircraft as shown in FIG. 3, with illustrative wave forms for the various major different outline zones of the aircraft image, the wave forms being diagrammatically illustrated in time-expanded form along the time reference axis for clarity of illustration.

Figure 5A:
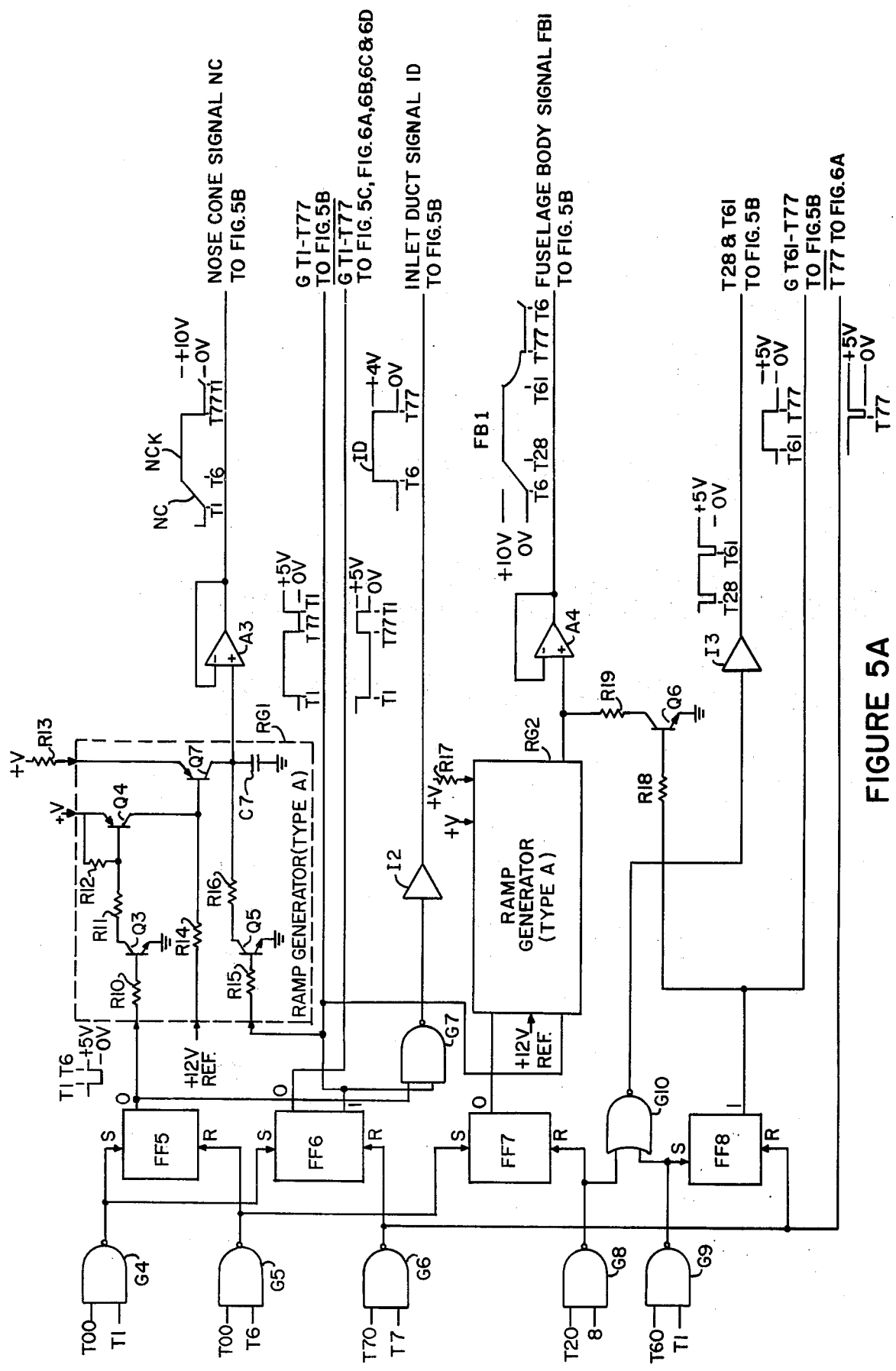
Figure 5B:
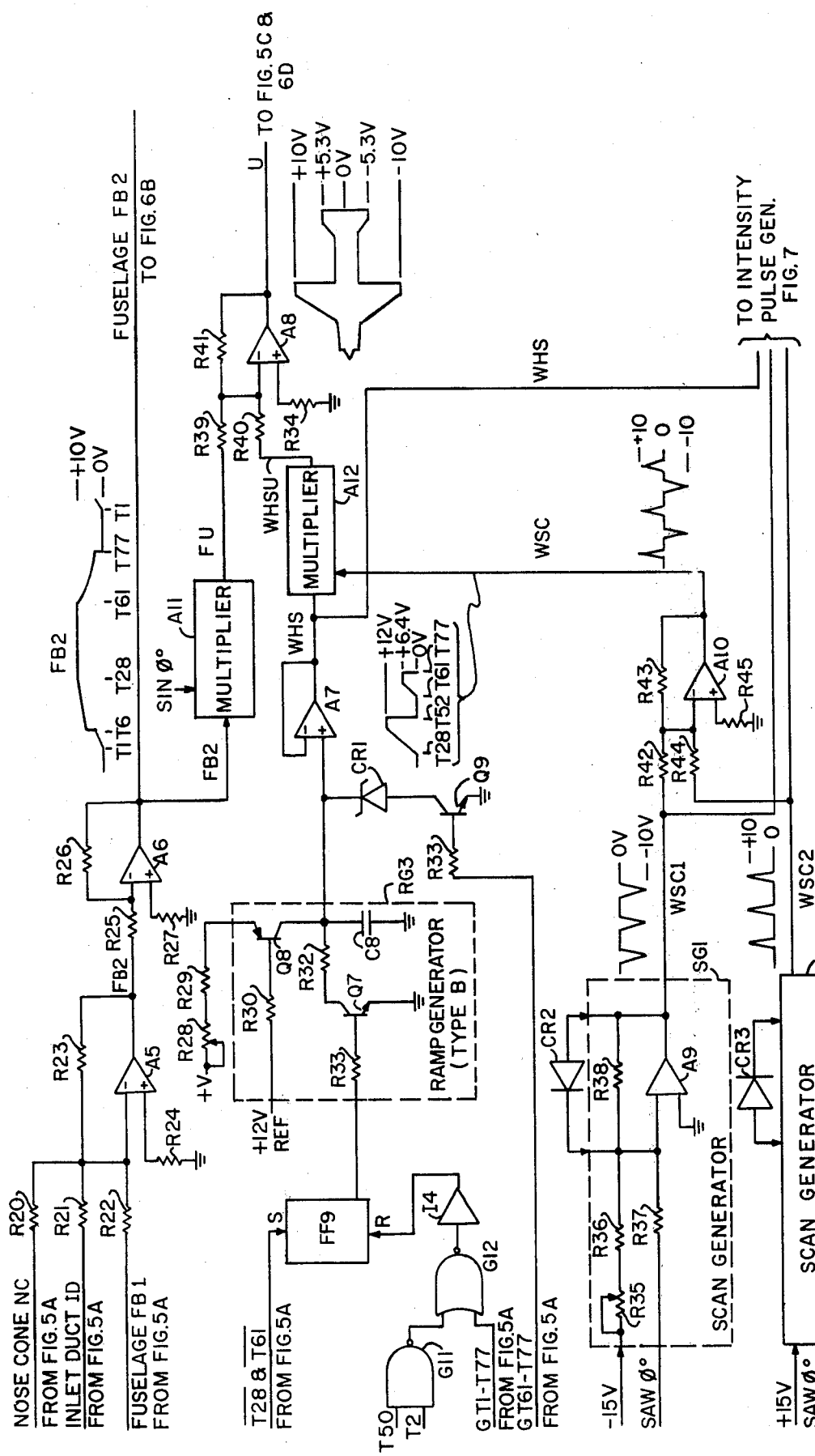

FIG. 5 is a schematic diagram, formed by FIGS. 5A and 5B on two separate sheets, of a portion of an object imaging and display embodiment according to the invention.

Figure 6A:
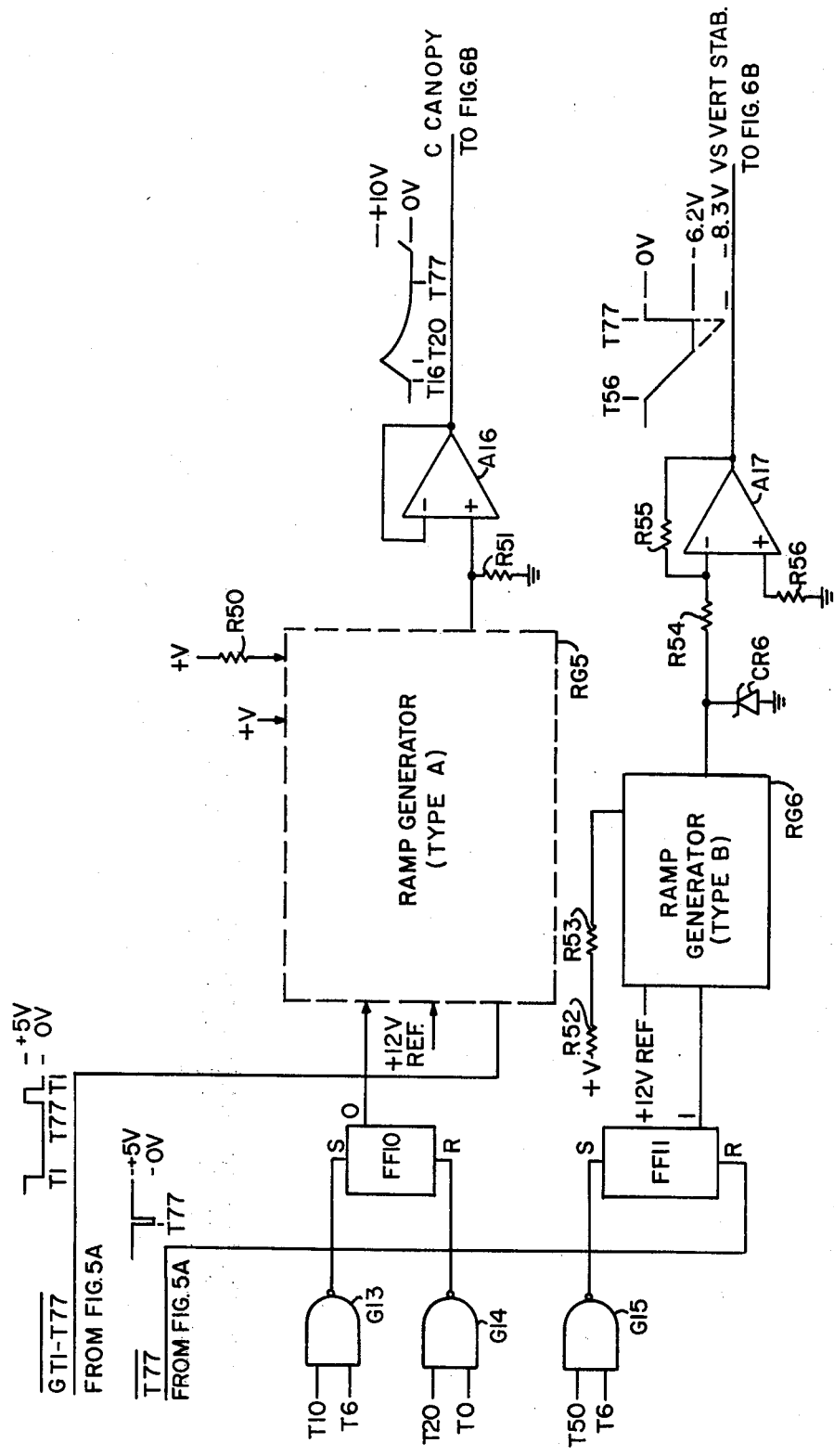
Figure 6B:
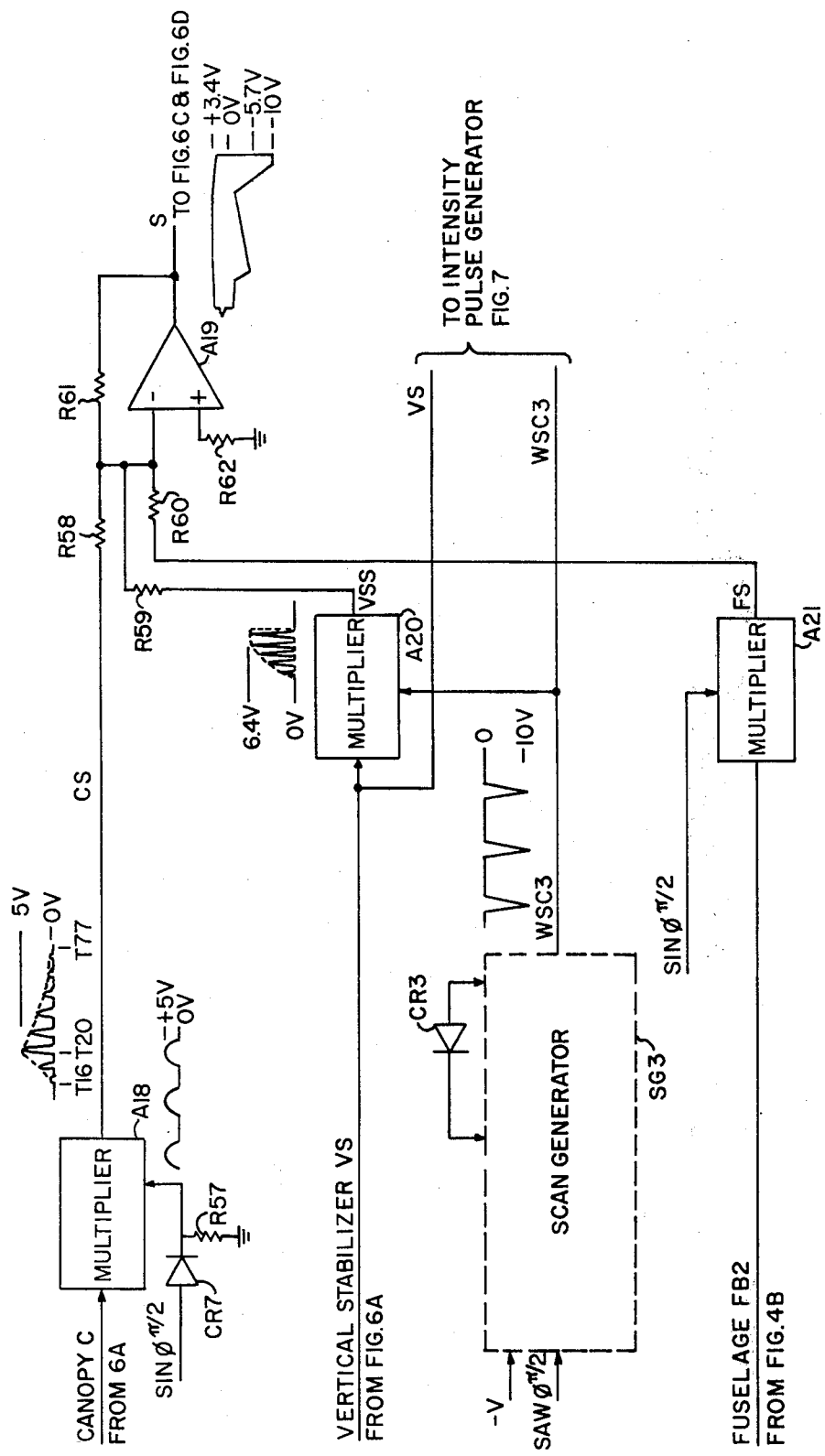

FIG. 6 is a further schematic diagram, formed by FIGS. 6A, 6B, 6C and 6D, on three separate sheets, of a further portion of an embodiment according to the invention.

Figure 7:
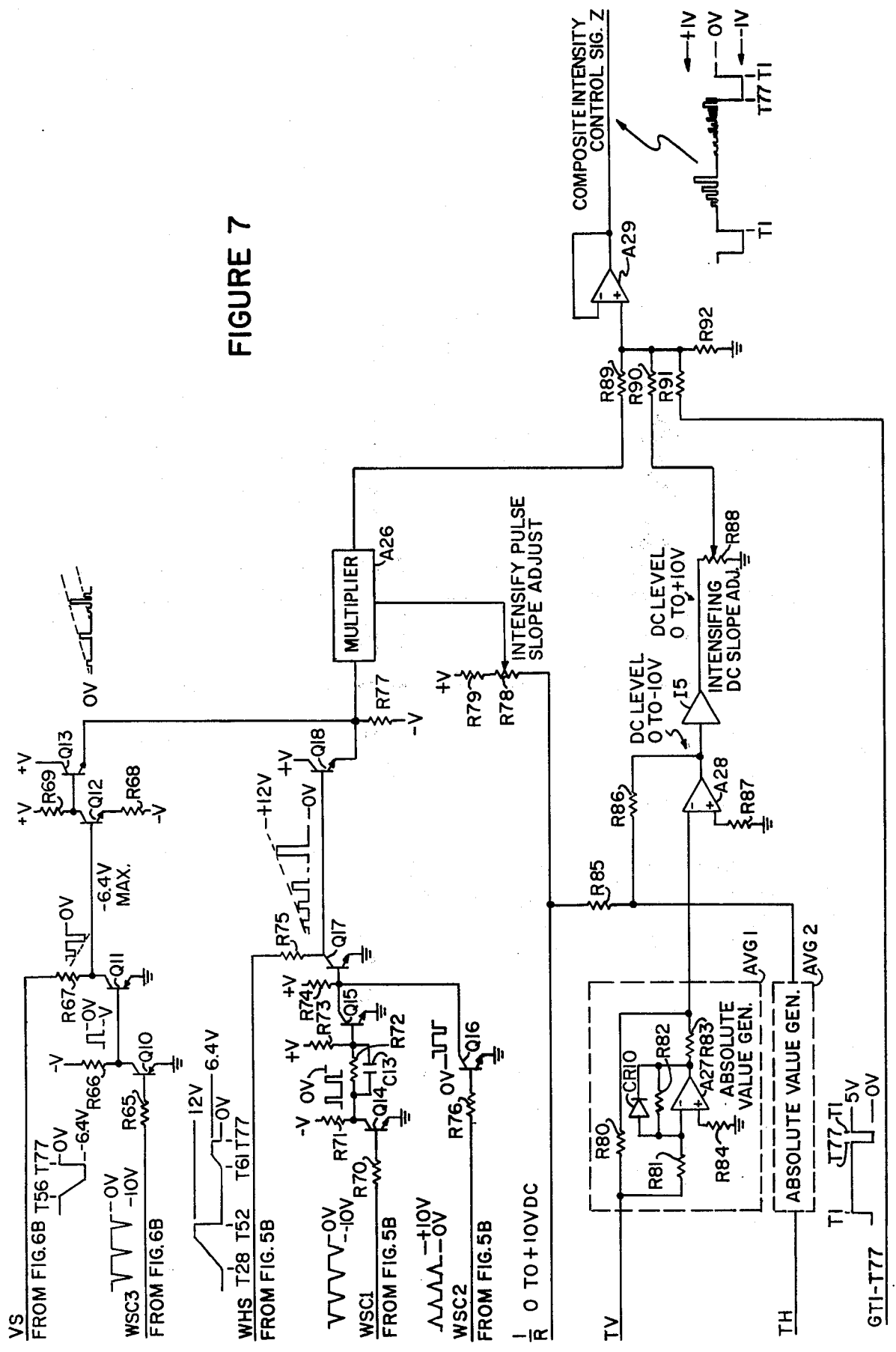

FIG. 7 is an additional schematic diagram, formed by FIGS. 7 and 7A, on two separate sheets, showing further details of an embodiment according to the invention.

Figure 8A:
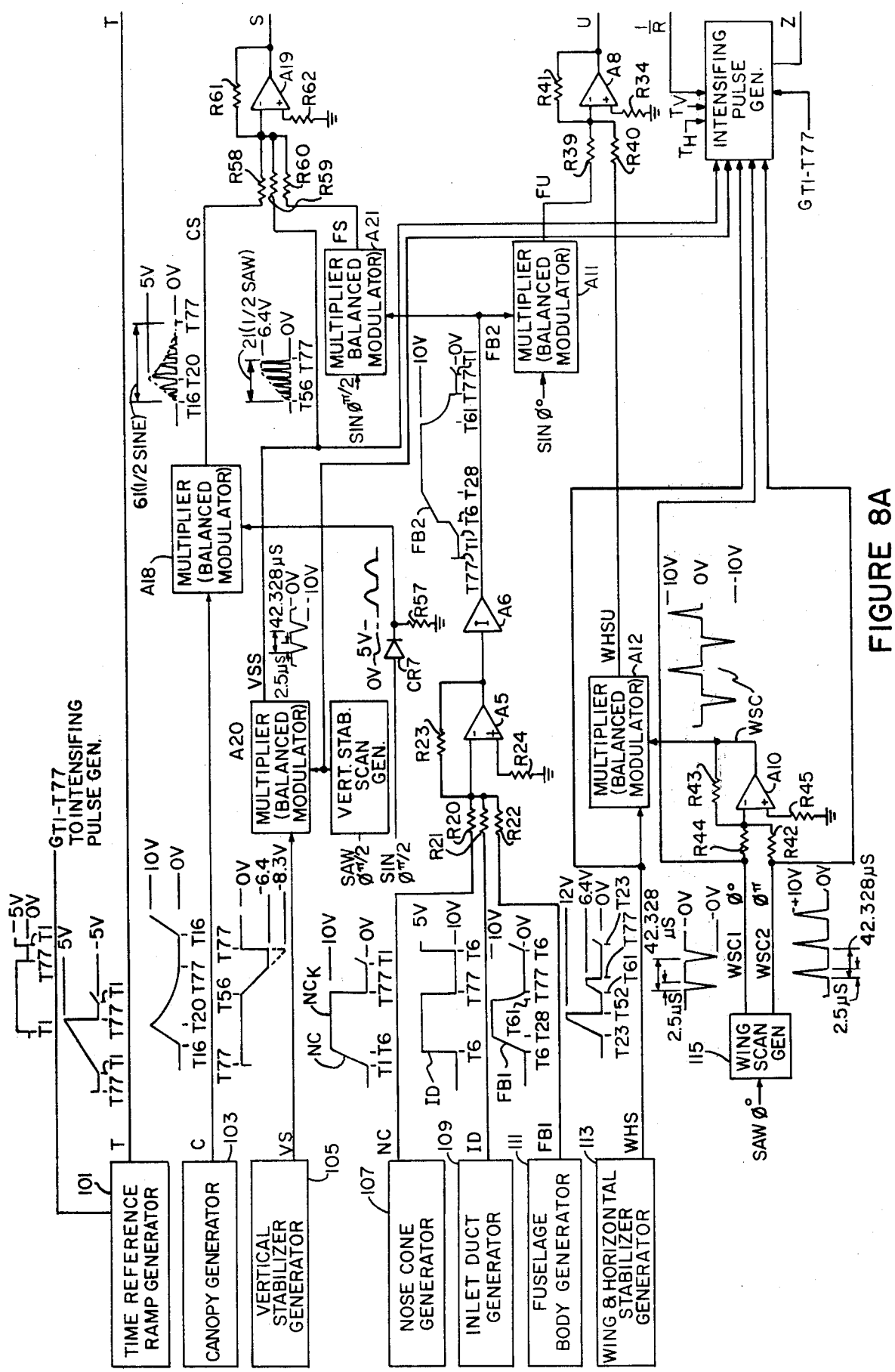
Figure 8B:
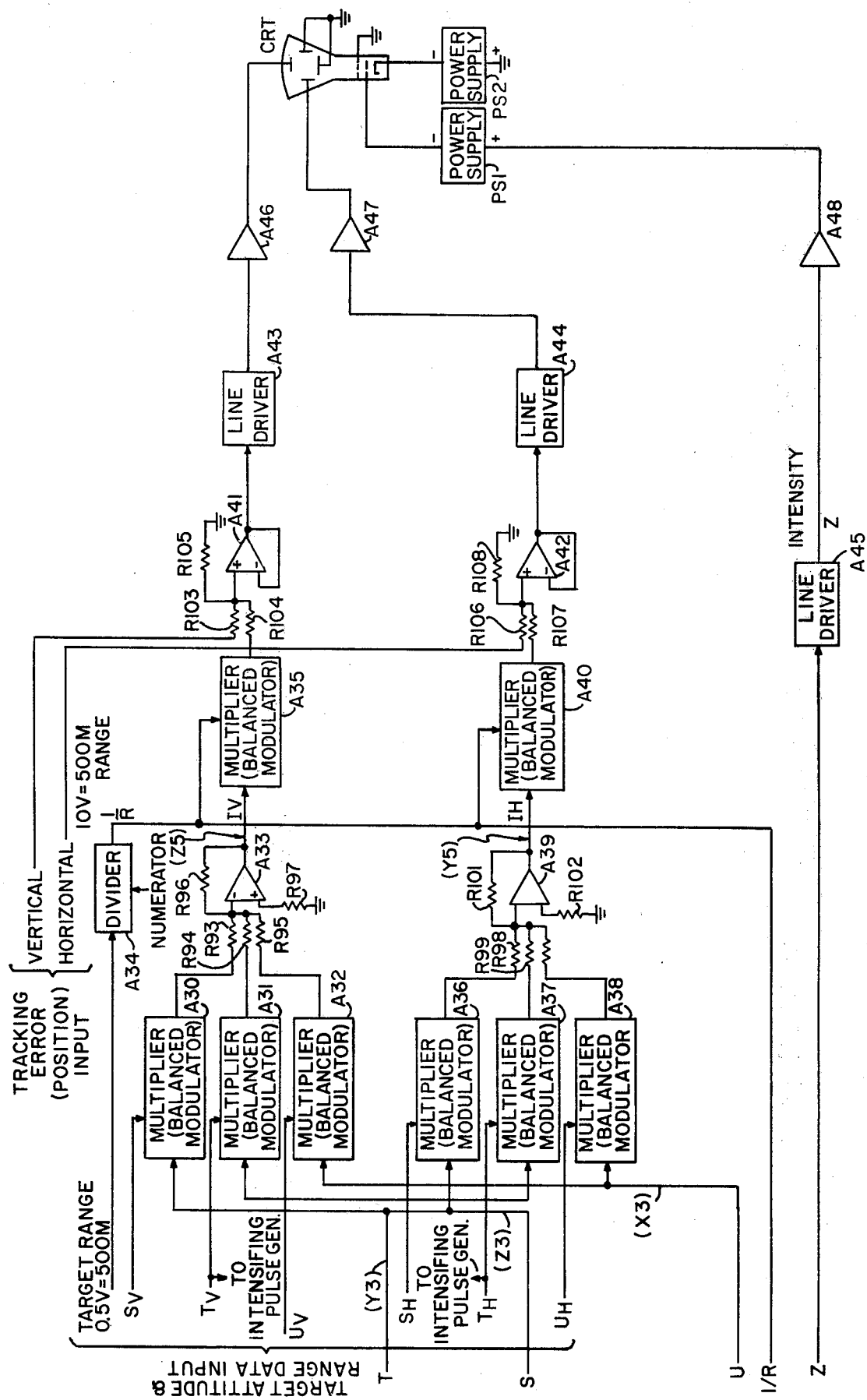

FIG. 8, formed by FIGS. 8A and 8B, is a block diagram illustrating an embodiment according to the invention.

Figure 9:
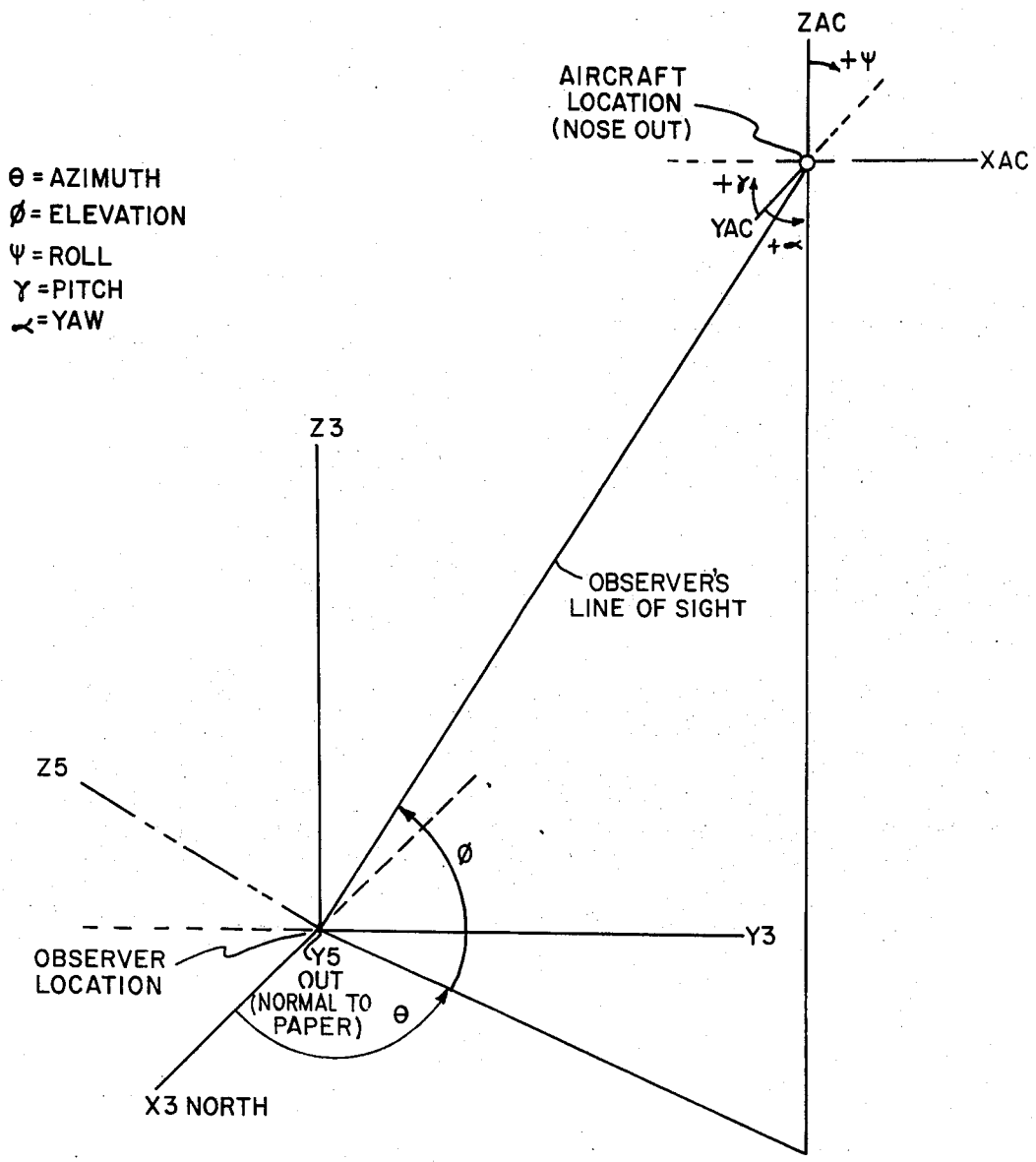

FIG. 9 is a diagrammatic illustration of the geometrical relationships of an observer and an object (e.g., aircraft) being simulated.

Figure 1:
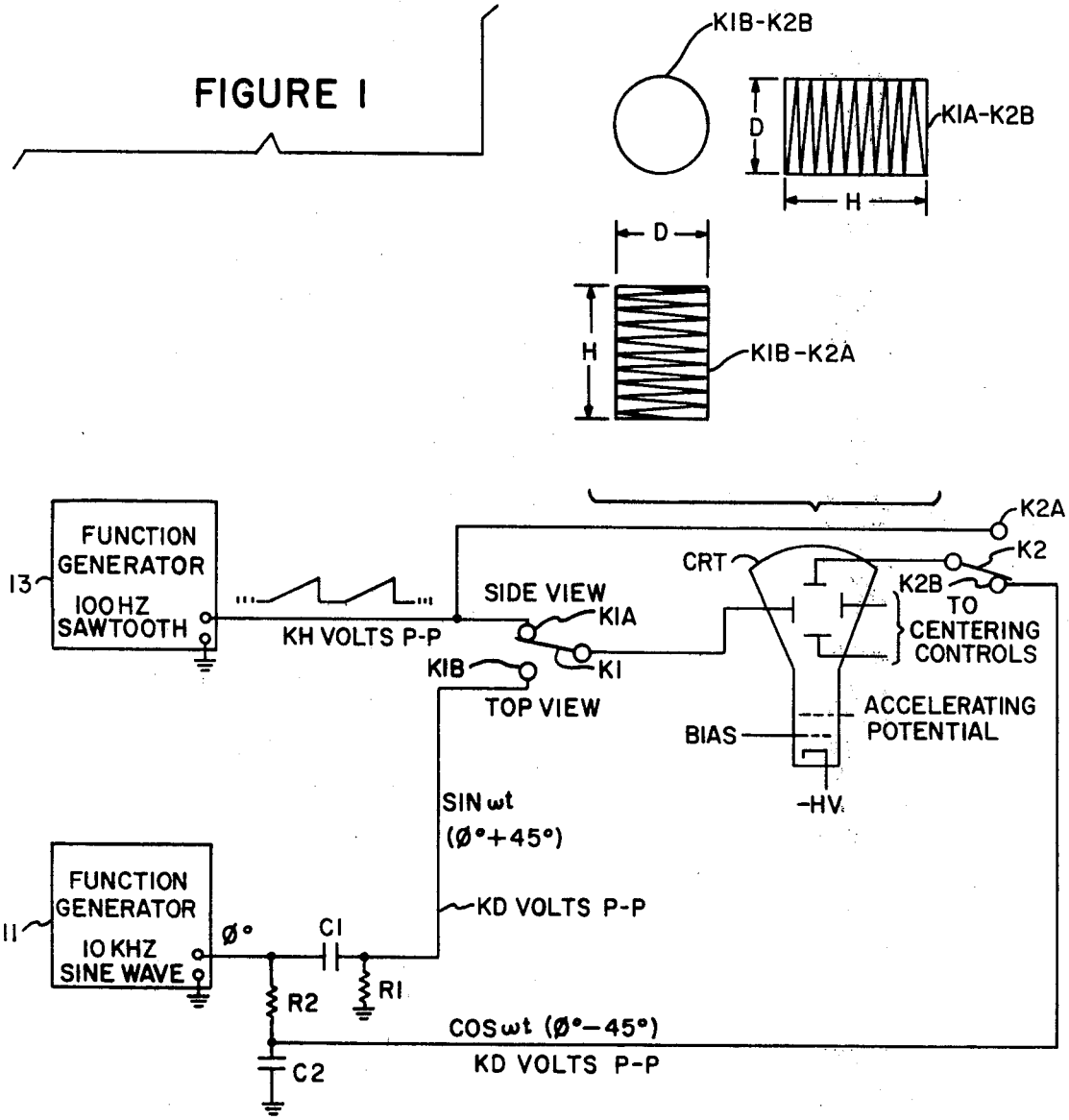
FIG. 1 is a schematic illustration of an imaging arrangement for artificially imaging and displaying a simple regular symmetrical object such as a hollow right angle cylinder through the employment of lissajous figures.

Referring now in detail to the FIGS. of the drawings, and considering first, for example, the problem of presenting a view of a hollow cylinder, if one views the hollow cylinder squarely from either end, he sees a circle. If viewed squarely from any side, a rectangular-shaped solid is seen. With a display device having a means of orthogonal beam deflection, such as cathode-ray tube (CRT), if two sinusoidal signals are applied to the cathode-ray tube deflection plates and these sinusoidal signals have a quadrature phase relationship, then the image displayed on the face of the cathode-ray tube will be a circle, just as one would see if he looked squarely into the end of a hollow cylinder. Now consider the side view of that hollow cylinder. If one of the sinusoidal signals that was used to generate the end view is removed and a linear ramp voltage having a long ramp sweep period relative to the period of the sinuosoidal signal (e.g., of the order of approximately 100 or more times as long) is applied in its place, a rectangular solid will be scanned onto the face of the cathode-ray tube (CRT). This rectangular solid may be scaled to have the same length-to-diameter ratio of the hollow cylinder by scaling of the ramp and sinusoidal voltages applied to the cathode-ray tube such that the ratios are the same. Reversal of the ramp and sinusoidal inputs to the cathode-ray tube will present the hollow cylinder either lying down or standing up. In the presentation of the end view of the hollow cylinder the electron beam in the cathode-ray tube is deflected in a constant radius circular pattern such that it appears as if one were viewing into the end of a hollow cylinder. In the presentation of the side view of the hollow cylinder, the electron beam in the cathode-ray tube is being deflected at a rapid rate from one side of the cylinder to the other and back while simultaneously being slowly deflected from top to bottom of the cylinder. In other words, a raster is scanned, the extremities of the raster corresponding to the rectangular envelope of the side view of a hollow cylinder and a solid image is presented. In order to obtain a uniformly intense display, blanking may be and is preferably applied to the cathode-ray tube to remove the image from the cathode-ray tube screen from the end of the sweep to the start of the next sweep. To prevent display flicker, the period of the ramp voltage should be less than 40 milliseconds. FIG. 1 illustrates such an arrangement enabling selective display of the end and side views of a hollow cylinder. Capacitor C1 and resistor R1 form a 45° phase shifter such that the sin $\omega t$ signal leads the sine wave source signal from Function Generator by 45° phase. Resistor R2 and capacitor C2 form another 45° phase shifter such that the cos $\omega t$ signal lags the sine wave source signal by 45° thus providing deflection signals in quadrature to the cathode-ray tube. The illustrative example given here, in part utilizes fundamental properties of the combination of two simple harmonic motions as given by the French scientist Jules A. Lissajous (1822–1880). The curves drawn by the combination of two simple harmonic motions are known as lissajous figures.

Considering a more complex object, one in which the three views are decidedly different, such as a jet aircraft which represents a relatively complex object, it is apparent that the foregoing simple illustration and arrangement will be totally incapable of closely approximating the various views of the aircraft or other complex object. In considering the problem of generating and presenting the top or bottom silhouette views of a jet aircraft, it will be seen that in such views one would see an aircraft having an outline including a fuselage, wings and horizontal stabilizers. The fuselage portion of this view is similar to the side view of a hollow cylinder, but differs therefrom in various fuseage sections of various aircraft, and the present invention accomplishes a desired degree of approximation simulation by varying the amplitude of the sinusoidal envelope-forming signal for the fuselage dynamically as a function of time as the ramp voltage varies from zero to its maximum level. In addition, the amplitude of a suitable AC envelope-forming signal (preferably sawtoothed so as to enable more close stimulation accuracy in front and rear views) for the wings and horizontal stabilizers is likewise varied as a voltage/time function, and is combined with the time-overlapping fuselage envelope-forming signal for composite imaging and display of the over-all aircraft outline. In an illustrative and preferred example zero ramp voltage is assigned to occur at the furthermost extremity of the nose of the aircraft and maximum ramp voltage is assigned to occur at the furthermost extremity at the rear of the aircraft, although this may be reversed, if desired and feasible with a particular configuration, and in some instances of particular object configurations to be simulated the reverse may in fact be desirable.

Means is provided to keep track of time during the ramp period so that the sinusoidal signal amplitude may be selectively varied dynamically as required for the simulation imaging and display. A repetitive pattern is scanned to enable display on a conventional cathode-ray tube, although cathode-ray tubes or other imaging arrangements, with relatively long memory capability, may be utilized with a single sweep input, if desired, and if continuous dynamic object change (e.g., attitude, size, etc.) is not necessary or desired to be presented.

Figure 2:
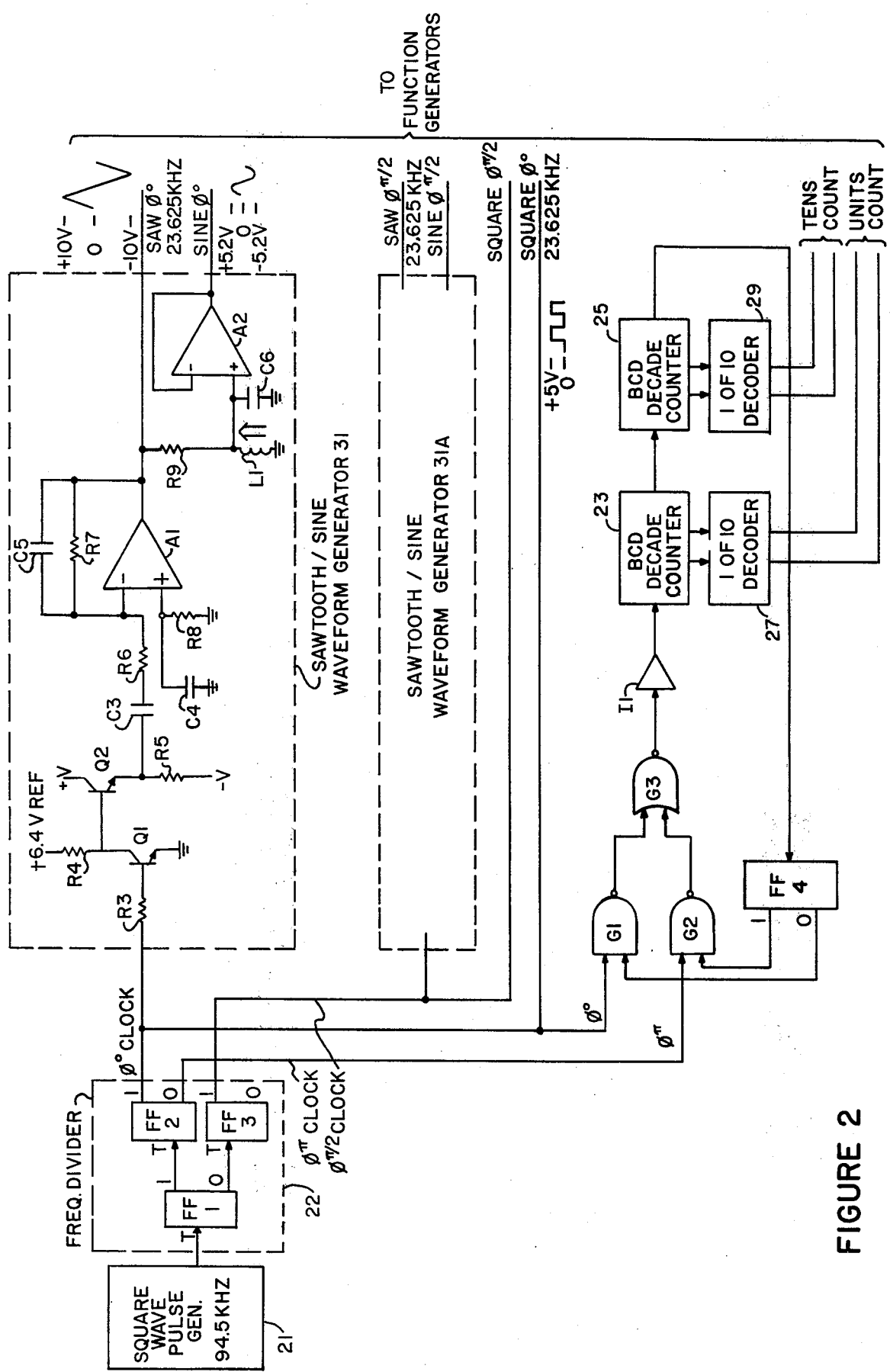
FIG. 2 is a schematic block diagram, in partial detail, of a wave form and reference count generating arrangement according to the invention and employed in the illustrative embodiment.

Referring to FIG. 2, a square wave generator 21, in the form of an oscillator operating at four times the sinusoidal signal is illustrated as the clock or timing reference. A series of toggling flip-flops FF1, FF2, and FF3 count down from the basic oscillator frequency to provide three square wave clock pulse signals of respectively $\phi°$, $\phi^{\pi/2}$, and $\phi^{\pi}$, phase, all at one-quarter the frequency of the generator 21. One or more of these three clock pulse signal trains may be employed as count pulses for selectively effecting various switching operations during the ramp period. It will be appreciated that by selecting a frequency for the oscillator at four times the AC counting and envelope-forming frequency signal, two wave forms in exact quadrature may be readily generated therefrom, through the respective outputs from flip-flops FF1, FF2, and FF3. The significance of this will be discussed later. In the hollow cylinder example, a ratio of 100 was chosen for the ramp-to-sinusoid time period. This ratio determines the granularity of the image. For small display sizes, a 100-to-1 ratio is satisfactory. For larger display sizes one may chose a larger ratio but must, as will be shown, be aware of a greater signal bandwidth, and hence some restrictions in ratio selection exist. A means is provided for obtaining an apparently higher scan ratio, with a relatively lower actual scan ratio, by interlacing, and is described later.

It has been found desirable to operate the basic oscillator frequency at about 100 kHz. When utilizing the invention for TV display via a scan conversion, it is possible to "write" the image during the vertical interval plus several TV lines on either side of the vertical interval and than "read" the image during the remainder of that TV field. A total of 67 TV lines for writing was found not objectionable. It is desirable to derive the basic TV timing from the same basic oscillator frequency. Considering the closest integer multiple of the standard broadcast line rate of 15,750 kHz to the desired 100 kHz basic oscillator frequency, one finds the sixth haromine to be 94.5 kHz. This frequency was thus chosen as the basic oscillator frequency. The AC counting and envelope-forming frequency in such instance will then be 23,625 hertz. The maximum number of 23,625 hertz sine waves one can have during 67 TV lines is 78.75. Although this is less than the desired 100, it will suffice for relatively small displays. The exact count used is 77 so as to allow ½ cycle additional time for interlace and be certain of having enough time to complete the count. The particular frequency chosen is thus adapted for TV scan presentation, as through the employment of a scan/converter arrangement of conventional or other desired design; however, the illustrative embodiment is illustrated as applied to a conventional simple X-Y coordiate cathode-ray tube display, as such as preferable from various standpoints including particularly the relative simplicity of the display-associated circuitry and the more ready feasibility of good resolution of the displayed image or images in smaller sizes of the image.

Two binary-coded decimal counters 23, 25 are, on alternate total ramp cycles, toggles in series from the 23,625 kHz $\phi°$ and $\phi^{\pi}$ clock square waves, respectively, directly from 1 and 0 outputs, respectively, of flip-flop FF2. Associated one-of-ten decoders 27, 29 provide units and tens decimal digit output counts which permit identification of specific time increments between 00 and 77. Two-legged NAND gates G4–G15, or other similar or suitable logic arrangements, then permit selection and gating, switching etc., of any one of the 77 time increments during the ramp period. When employing an X-Y output display the counter 23, 25 may be permitted to continue to count to 99 and then start over at 00. Since all cathode-ray tube displays have some limitation in spot retrace time, the additional period of 23 time increments allows cathode-ray tube sweep retrace and settling, as well as time for the image generation circuits to settle. Less time is sufficient, but 77 increments has been selected to enable TV display if desired, and this leaves the extra 23 time increment period. After establishment of the exact number of time increments from nose to tail of the object (e.g., aircraft) to be displayed, a scale drawing of the object top view may be drawn and then divided into that number of increments, in this case 77.

In the top (bottom) plan view of the aircraft outline image shown in FIG. 3, there are four distinctly different contour changes in the outline. They are: (1) a nose cone section linearly increasing in diameter extending from T-1 to T-6, (2) a step section at the jet inlet at T-6 extending to the tail of the aircraft, T-77, (3) a fuselage section with a nearly linear increase in fuselage diameter from T-6 to T-28 constant from T-28 to T-61 and then a decrease from T-28 to T-77, and (4) a wing and horizontal stabilizer section whose leading edge has a constant slope to the rear of the aircraft, whose tip is truncated and whose trailing edge is normal to the fuselage The wing root starts at T-28 and ends at T-52 and the horizontal stabilizer root starts at T-61 and ends at T-77.

It is possible to generate the outline of one-half of the top view of the aircraft by the summation of several function generators, each function generator adding a distinct contour change. Multiplication of the outline of one-half of the top view of the aircraft by an AC signal in a balanced modulator (a simple sinusoidal signal is acceptable and preferred for simplicity and clarity of display, for the fuselage; and a time-overlapping sawtooth AC signal of the same frequency and phase is preferred for the wings and stabilizers in view of the desirability of utilizing the wing signal also for simulated wing front and rear views and/or partial combination views, where the sharp tapered edges of the wings and stabilizers are both simulated in the sharp sawtooth wave from signals) will then result in a complete top view of an aircraft when displayed with and as a function of a linear time base as may be provided by a time reference ramp signal. One now has a sinusoidal envelope-forming signal whose amplitude varies dynamically as a function of time as the ramp voltage varies from zero to its maximum level, and the peak-to-peak signal amplitude varies in time as a function of the aircraft plan view outline from nose to tail.

Figure 5C:
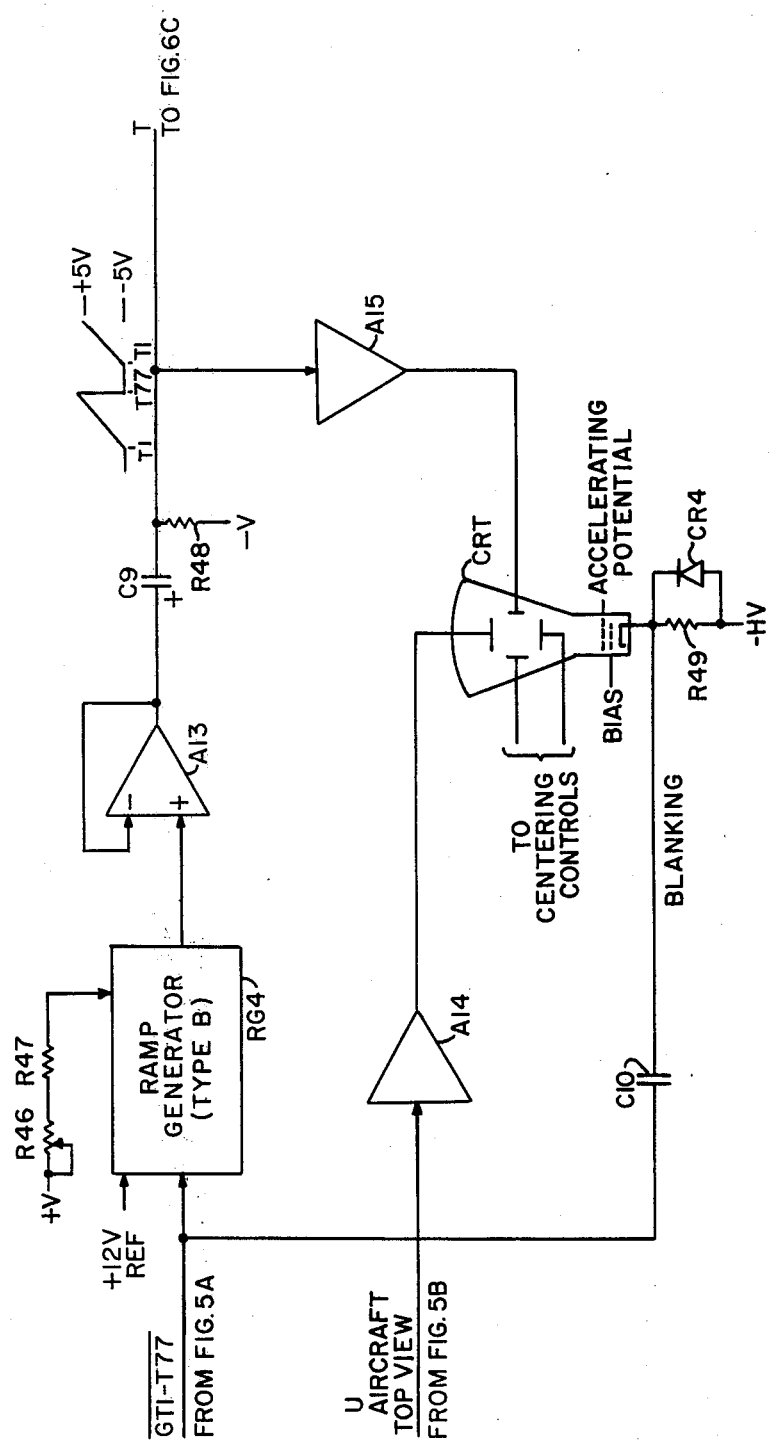

To obtain the dynamically amplitude varying AC envelope-forming signal, one must first generate the distinctly different contour changes which reflect the outline of the object whose image is being simulated. FIG. 5 (made up of FIGS. 5A, 5B and 5C, and shown on three respective sheets) is a block diagram of the circuitry used to generate the top view of an aircraft silhouette. For the moment, consider only the fuselage portion of the top view (i.e., minus the wings and horizontal stabilizer). Points at which a sufficiently contour change occurs as to render display of such desirable, are determined in the illustrative example to occur at times T-1, T-6, T-28, T-61 and T-77. A pulse occuring at those times is generated by NAND gates G4, G5, G6, G8, and G9.

The fuselage is made up of the nose cone, an air inlet duct and a fuselage body. For convenience two of the three components (nose cone and fuselage body DC ramp signals) are scaled such that the vary from 0V to a maximum of 10V peak. The third one (inlet duct) varies from 0V to 5V peak. The nose cone, signal generator 107 (FIG. 8A) generally comprises a ramp generator RG1 (FIG. 4A) and associated flip-flops FF5 and FF6, together with NAND gates G4, G5 and G6, and amplifier A3. Ramp generator RG1 is also designated for convenience as a Type "A" ramp generator, as this same ramp generator circuit may be utilized elsewhere in the system, and it will thereby enable reference thereto without necessitating duplicate illustration of the details thereof. The nose cone is caused to be simulated by a DC ramp voltage signal NC starting at T-1 and ending at T-6. The ramp amplitude is then held constant as indicated at $NC_K$ from T-6 until T-77 and thus forms a constituent of the remainder of the fuselage body and all parts thereon from T-6 through T-77. To effect this DC nose cone ramp signal NC, flip-flop FF5 is set at T-1 thereby turning transistors Q3 and Q4 off. When Q4 is turned off, the base of Q7 assumes a potential of 12V. Q7 is a constant current generator by virtue of the constant base voltage and the resistance R13 in Q7's emitter. The constant current from Q7 charges capacitor C7. A linear ramp voltage is generated across C7 in accordance with the equation $$E = \frac{1}{C} \int T i \, dt.$$

For C equal 0.1 microfarad, E equal ten volts and T equal 211.64 microseconds, the charging current supplied by Q7 and set by the emitter resistance R13 is 4.7 milliamperes. Transistors Q3 and Q4 are turned on after T-6 thus removing capacitor C1 charging current I. The capacitor C1 effectively holds its charge for the time T-6 to T-77 at which time transistor Q5 is turned on shorting capacitor C1 unitl T-1 and the cycle is repeated. Resistors R10, R14 and R15 are current-limiting resistors and are not too critical. A value of 1K ohms may be suitably used. Resistors R11 and R12 form a voltage divider such that when transistor Q3 is turned on, the base of Q4 will be less than the 12V reference causing Q4 to go into saturation and placing +V on the base of Q7, thus turning it off. Resistor R16 is a peak current limiter for discharging C7. A value of 10 ohms has been found suitable in one embodiment. Amplifier A3 buffers the voltage developed across capacitor C7. Its DC ramp output signal represents the nose cone portion of the aircraft fuselage.

The air inlet or inlet duct is caused to be simulated by a step function starting at T-6 and ending at T-77. This is effected by inlet duct generator 109 generally comprised of flip-flops FF5 and FF6 and NAND gates G4, G5, G6, and G7 and inverter amplifier I2. NAND gate G7 "ands" the outputs of T1-77 gate and $\overline{T1-6}$ gate to obtain a step function between T-6 and T-77. Amplifier I1 inverts the step function to provide a positive going signal for summation with the nose cone function to yield a composite DC signal which is a function of the composite areas defined by the nose cone signal NC and the fuselage body signal FB1 (before subsequent modification) and FB2 (after subsequent modification to reflect the canopy outline area).

The fuselage body is caused to be simulated in a manner similar to that used for the nose cone. The fuselage body generator 111 for generating DC ramp signal FB1, minus the side view canopy outline area and minus the inner contiguous and extended areas defined by nose cone and inlet duct signals NC and ID, is generally comprised of ramp generator RG2, amplifier A4, capacitor discharge control network Q6, R18, R19, flip-flops FF6, FF7, and FF8, and associated NAND gates G5, G8, G9, and G6. Flip-flop FF7 sets at T-6 turning transistors Q3 and Q5 off in the same manner as described for the type A ramp generator RG1. At T-61 transistor Q6 is turned on, causing capacitor C7 to slowly discharge through R19 shunting resistor in accordance with the equation $e = E (e^{-t/RC})$; where E is 10V, t is 677.25 microseconds, R is 1.5K and C is 0.1 microfarad. Some residual voltage is left on C3 just prior to T-77 and R19 shunt resistor across C3 is selected to yield the desired residual voltage. Amplifier A4 buffers the fuselage generator voltage.

Amplifier A5 sums the three fuselage components, nose cone, air inlet and fuselage body, to form one composite signal FB2 representing one-half of the outline of the top view of an aircraft fuselage having an instantaneous time relationship with some linear time base extending from the forward extremity to the aft extremity of the aircraft. Selection of the summing resistors for amplifier A5 may be employed to provide suitable proportions of the component area signals NC, ID and FB1 in the composite fuselage, signal FB2 to reflect their relative size relationships in a generally true image outline.

As seen in FIG. 3, in the illustrative example the maximum fuselage diameter occurs at T-28 and is measured as 3.4 imaginary units. The nose cone starts from 0 amplitude and reaches a maximum diameter of 1.7 units at T-6. The diameter of the fuselage at T-6 is 2.5 units. A value of 10V peak is selected as the maximum output of amplifier A5. This value is compatible with a practical maximum output level of a typical amplifier A5 and the input range of multiplier A11.

Consider now the nose cone amplitude at T-6. The input voltage is +10V and the contribution of the nose cone signal NC to the total fuselage signal FU is 1.7/3.4 or 0.5, hence the gain of the summing amplifier for that particular signal should be 0.5. A feedback resistor R23 value of 10K is arbitrarily chosen after some consideration on loading effects. The summing resistor R20 value yielding a gain of 0.5 is 10K/R=0.5 or R=20K. Next consider the fuselage amplitude at T-6+. The input voltage from the air inlet or inlet duct step function is +4V and the contribution of inlet duct signal ID to the change in fuselage diameter at T-6 is $$\frac{2.5 - 1.7}{3.4} \times \frac{10}{4}$$

or 0.5925. Assuming a perfect summing amplifier one can by superposition compute the summing resistor R21 for the air inlet step function having a gain of 0.5925. That value is 0.5925=10K/R or R=16.87K. The nearest standard value of 16.9K is used. Now consider the fuselage amplitude at T-28. The input voltage from the fuselage body signal FB1 is +10V and the contribution of the change in fuselage diameter from T-6 to T-28 is $$\frac{3.4 - 2.5}{3.4}$$

or 0.265. By the same method one may compute the summing resistor R22 for the fuselage body signal FB1 component of the composite signal as desirably having a gain of 0.265. That value is 0.265=10K/R or R =37.77K. The nearest standard value of 38.3K is used. The output of A5 is now the DC composite sum signal of each of the three DC signal components NC, ID, and FG1, and composite signal FB2 is representative of one-half of the fuselage is viewed in plan view, with the same amplitude relationship to each other as the aircraft dimensions have. The fuselage being symmetrical along multipliers length in plan view, the composite signal FB2 is also a direct function of the entire plan view of the fuselage. As will be shown later this same signal FB2 may be used to generate a portion of the side view of the aircraft. Inverter amplifier A6 inverts the signal from A5 in a unity gain inverter and inverts composite signal FB2 to a positive going signal.

Control of the amplitude of a sinusoidal signal may be considered as a multiplication process. In a linear potentiometer the output voltage is the product of the fraction of shaft position to total shaft rotation and applied voltage across the potentiometer. Rapid back-and-forth rotational motion of the potentiometer shaft will cause the output voltage to rapidly increase and decrease in amplitude. It would be possible to generate the composite sum of the fuselage components by a shaped potentiometer resistance and constant shaft rotation or conversely a linear potentiometer resistance and a programmed shaft rotation controlled by cams, levers, etc. From a practical standpoint such a method has severe life restrictions among other things. The advent of low-cost solid state multipliers (balanced modulators) now allows multiplication over a reasonable dynamic range of two electronic signals without resorting to mechanical means. Such a multiplier is used as A11. An example of a four-quadrant analog multiplier (also usable as a divider) having good linearity and frequency response and suitable for all of the various multipliers and dividers utilized and described in the illustrative embodiment of the invention, is found in Burr Brown Multiplier/Divider Model 4094/15C. The fuselage composite sum signal FB2 representing the three component signals describing, and associated areas making up, the outline of the fuselage as a function of time, is applied to one input of the multiplier or balanced modulator A11. The other input to the balanced modulator is a sinusoidal signal sin $\phi°$ derived from the wave form generator 31 shown in FIG. 2. At the output of the balanced modulator A11 a modulated envelope-forming signal FU is formed, the instantaneous amplitude and polarity of which is proportional to the instantaneous product of the two applied signals. Since a constant amplitude sinusoidal signal is applied to one of the inputs, and the other input varies dynamically between 0V and +10V, the output FU is a sinusoid whose amplitude varies dynamically in amplitude to scan a solid image of the fuselage outline for the aircraft illustrated in FIG. 3 when displayed as a function of time.

Considering next the wings and horizontal stabilizers of the aircraft in FIG. 3, these were purposely omitted from the generation of the fuselage signals FB2 and FU, because they present a different cross-sectional view than the fuselage when viewed from the nose end of the aircraft, particularly the wings are effectively tapered in an elongated triangular shape as viewed in frontal cross-section. If one were only generating a top or plan view of the aircraft then one could use the fuselage sinusoid multiplier signal $\phi°$ for both the wings and the fuselage; however, as will be shown if care is taken and a desired quadrature phase relation is maintained when the top and side view of the aircraft are generated as a function of time, then the nose end view will be implicit in the top and side views. The nose end view may then be displayed by applying only the side and top view of the aircraft to the cathode-ray tube deflection plates. For the time being, let it suffice to say that the wings and horizontal stabilizers will be scanned by a wave form other than a sinusoid.

The wings and horizontal stabilizers are simulated in the same circuitry due to their similarity and the fact that they have the same taper. For the moment consider that the wings and horizontal stabilizers as viewed from the top or plan view are fully triangular-shaped (i.e., without the actual truncation at the tips as shown in FIG. 3). Points at which a contour change occurs in such instances are T-28, T-52, T-61 and T-77. A pulse occuring at those times is generated by NAND gates G8, G11, G9 and G6. The wings are caused to be simulated by ramp voltage signal WHS from the wing and horizontal stabilizer generator, the ramp for the wings starting at T-28 and ending at T-52. The horizontal stabilizers are caused to be simulated by the same ramp signal WHS starting at T-61 and ending at T-77. The wing and horizontal stabilizer generator is generally comprised of ramp generator RG3 (which is generally indicated as a Type B ramp generator, this same ramp generator circuit being utilized in others of the various system units such as the vertical stabilizer signal generator and being there simply designated by this Type B designation), buffer amplifier A7, capacitor charge level control network CR1, Q39, and R33, flip-flops FF9 and FF8, and NAND gates G8, G9, G6, and G11, NOR gates G10 and G12, inverting amplifiers I3 and I4, and resistance network R28, R29 to ramp generator RG3. Flip-flop FF9 is set at T-28 through NOR gate G10 and inverting amplifier I3, thereby enabling the ramp generator RG3 and allowing capacitor C7 to charge from the constant current generator and its associated components. A linear ramp voltage is thus generated across C8. At T-52 flip-flop FF9 is reset through NOR gate G12 and inverting amplifier I4, thereby returning the ramp voltage to zero. At T-61 flip-flop FF9 is again set through NOR gate G10 and inverting amplifier I3 and another ramp is similarly generated. At T-77 flip-flop FF9 is again reset through NOR gate G12 and inverting amplifier I4. By the addition of a zener diode CR1 of the proper breakdown voltage across the output of capacitor C8 the amplitude of the voltage developed across capacitor C8 will be limited to this breakdown voltage, and if sufficient charging current is supplied to C8 in the time period it is allowed to charge sufficient voltage will be reached which will cause the zener diode CR1 to break down and a truncated ramp will have been generated. For convenience, a maximum signal level of about 12V, equal to the maximum amplifier input voltage has been chosen to represent the wing from its root to its tip (i.e., the amplifier is allowed to go into saturation). Adjustment of the charging current to C8 by means of rheostat R28 will allow one to obtain a voltage across C8 whose variation with time is proportional to the dimensions of the aircraft wings top view as shown in FIG. 3. Inasmuch as the horizontal stabilizer has the same leading edge slope, the same ramp time constant is used, only the maximum amplitude forming the truncated peak changes. Flip-flop FF8 is set at T-61 causing transistor Q9 to conduct. Zener diode CR1 and the saturation voltage drop across Q9 limit the voltage across C8 to 6.4V. Flip-flop FF8 is reset at T-77 and the cycle is repeated. Amplifier A7 buffers the voltage developed across capacitor C8. Its DC output signal WHS is a function of the wing and horizontal stabilizer portion of the aircraft and is applied as one input to balanced modulator A12.

Consider now the thickness of the wing near the root as compared to the plan view cross-sectional dimension of the fuselage. The fuselage diameter near the leading edge of the wing root is approximately 6.8 imaginary units. The wing thickness for the illustrative aircraft at the wing root is approximately 1.07 imaginary units. Previously, it has been mentioned that the nose end view of the aircraft is desired to be, and is formed as an implicit function of the top and side view composite envelope-forming AC signals. Consider the lissajous pattern obtained on a cathode-ray tube screen when two sinusoidal signals having exactly a ninety degree phase relationship between each other are applied to the deflective plates of a cathode-ray tube. One will see a circle being scanned on the cathode-ray tube screen. Now if the lissajous pattern is distorted by the instantaneous addition of a signal to the horizontal pair of deflection plates, and that signal is timed to be in phase with and occur at the peak of the horizontal input sinusoidal wave (both positive and negative) then the circle displayed on the cathode-ray tube face will become elongated in the horizontal plane. If the thus time-overlapping added signal is sinusoidal, an oval will be seen. If the added signal is a pulse, then a trapezoidal addition to each side of the circle will be scanned. In the case of an aircraft and in particular the wing as viewed from the nose end, one sees a narrow triangular section. The addition in time-overlapping timed phase relationship of a portion of a triangular wave to the horizontal sinusoidal signal will cause the lissajous pattern to resemble a wing attached to a fuselage, as shown schematically in FIG. 4. The amount of triangular wave desirable to be added to the sinusoidal wave is dependent on the ratio of the thickness of the wing at the root to the diameter of the fuselage. In the case of the illustrative aircraft under consideration, that ratio is 1.07/9.5 or 0.1125. The triangular wave signal amplitude, as shown in FIG. 2 is 10V peak. The thickness ratio of wings to fuselage is proportional to the amplitude of the triangular and sinusoidal waves at the point they are summed. In other words, if one clips about 9 percent of the positive and negative portion of the triangular wave and adds that to the sinusoidal wave, a nose end view of the aircraft may be obtained with wings having a good simulated approximation of the proper relative thickness. To this end, wing and horizontal stabilizer scan generator 115 is provided, which comprises generally scan generators SG1 and SG2, with associated diodes CR2 and CR3. Summing network R35, R36, R37, and R38 of scan generator SG1 and diode CR2 allow only the positive-most portion of the triangular wave to pass. The amplifier A9 is an inverting amplifier, and hence the resultant wave form is negative. A similar scan generator circuit SG2, with oppositely connected diode CR3, allows only the negative-most portion of the triangular wave to pass as an output. The peaks of the triangular wave thus isolated correspond to the scanning lines for the right and left wing. The modified triangular wave signals are summed in amplifier A10 to form a composite wing and horizontal stabilizer scan signal WSC, and composite signal WSC is applied to balanced modulator A12 to form composite modulated envelope-forming signal WHSU. The modulated AC envelope-forming time-overlapping timed phase outputs WHSU and FU of balanced modulators A12 and A11 represent respectively the wings, horizontal stabilizers, and the fuselage. These two time-overlapping timed phase signals WHSU and FU are summed in summing amplifier A8. The summing resistors R39, R40 are selected such that the voltage ratio of fuselage diameter-to-wing span is the same as the dimension ratio of the aircraft in FIG. 3 and the output voltage swing is within the capabilities of the amplifier selected. The dimension ratio of the illustrative aircraft fuselage diameter-to-wing spread is approximately 6.8/38.4 or approximately 0.177. In selecting the summing resistors for A8, two somewhat arbitrary decisions may be and are made: (1) the value of feedback resistor R41 is selected as 10K and (2) the maximum wing span is to be represented by 20V peak-to-peak. The fuselage output voltage from modulator A11 is 10.5V P-P at the maximum diameter, therefore a gain of 1.77/5.25 or 0.337 is required in A8. The summing resistor R39 value is then 10K/0.337 or 29.6K. Similarly, if the maximum wings and horizontal stabilizer voltage is 20V P-P at the maximum wing span, and an amplifier output voltage of (10) - (1.77), or 8.23V), is required, than a gain of 8.23/10 or 0.823 is necessary. The summing resistor R40 value is then 10K/0.823 or 12.4K. The output of amplifier A8 now has a signal whose amplitude varies dynamically as a function of time. The envelope of this signal traces the top view outline of the aircraft shown in FIG. 3 when viwed as a function of time and the combination of sinusoidal waves gives the illusion of a solid image. Presentation of the top view on a cathode-ray tube requires the top view signal from amplifier A8 to be applied to one set of the deflection plates (e.g., the vertical deflection plates) and a ramp starting at T-1 and ending at T-77 to be applied to the other set of deflection plates (e.g., the horizontal deflection plates). The DC time reference ramp signal T is generated by ramp generator RG4, which employs a ramp generator circuit Type B as previously described with reference to wing and horizontal stabilizer generator 113 and its ramp generator RG3. Time reference ramp generator 101 generally comprises ramp generator RG4, and associated resistors R46, R47, amplifier A13, capacitor C9, resistor R48, flip-flop FF6, and NAND gates G4 and G6. Resistors R46 and R47 set the slope of the ramp. Between the time T-77 and the next T-1 the cathode-ray tube beam is turned off to prevent damage to the cathode-ray tube screen. The signal that turns the cathode-ray tube beam off is called the blanking signal and is applied between the grid and cathode of the cathode-ray tube. Flip-flop FF6 generates the blanking signal. Details of suitable cathode-ray tube circuitry for this purpose may be obtained from Volume 22 MIT Radiation Laboratory Series "Cathode Ray Tube Displays", copyright 1948, NcGraw-Hill Book Co.

The sinusoidal and triangular wave shapes used in the generation of the aircraft top view are generated from the phase 0 and phase $\pi/2$ square waves, square $\phi°$ and $\phi^{\pi/2}$, originating in the timing signal generator formed by square wave pulse generator 21 and frequency divider 22 shown in FIG. 2. FIG. 2 contains a schematic diagram of the wave shape generators. The respective square wave, square $\phi°$ and square $\phi^{\pi/2}$, is normalized to a 6.4V peak-to-peak signal before being applied to the respective integrating amplifier A1 of respective identical sawtooth/sine wave form generators 31 and 31A. The integrating amplifier A1 converts the square wave into a triangular shaped wave symmetrical about 0V. A resonant tank circuit, L1 and C6, converts the triangular wave to a sinusoidal wave. An amplifier, A2, on the output of the resonant circuit buffers the sine wave to the various balanced modulators. Identical circuitry is used for generating quadrature wave forms from the 23.625 kHz phase $\pi/2$ square wave, square $\phi^{\pi/2}$. The sinusoidal wave forms are adjusted to be in phase with their respective triangular wave by means of the resonant tank circuit. Final adjustment of L1 in the resonant tank circuits may be made to place the sinusoidal wave forms in exact quadrature.

Generation of the side view of the aircraft simulation outline in FIG. 3 is accomplished in much the same way the top view was generated. Looking at the side view, one would see an aircraft having five distinctly different contour changes in the outline. These are: (1) a nose cone linearly increasing in diameter extending from T-1 to T-6, (2) a step at the air inlet duct at T-6 extending to the tail of the aircraft, T-77, (3) a nearly linear increase in fuselage diameter, minus the canopy, from T-6 to T-28 then a nearly constant diameter to T-61 and then a decrease in fuselage diameter from T-61 to T-77, (4) a canopy on the top half of the fuselage giving an elliptical shape to the top half of the fuselage. The canopy starts at T-16 and increases linearly in height to T-20 at which time it decreases to T-77, (5) a vertical stabilizer whose leading edge has a constant slope to the rear of the aircraft, whose tip is truncated and whose trailing edge is normal to the fuselage. The horizontal stabilizer root starts at T-56 and ends at T-77.

The first three contour changes may be recognized as the same three making up the fuselage for the top view. It is possible to generate the side view of the aircraft in FIG. 3 by the summation of several function generators, each function generator contributing a wave form representing a fuselage, a canopy, and a vertical stabilizer. In the aircraft of FIG. 3 the side view of the fuselage, minus the canopy, is identical to the top view of the fuselage. As such, the same signal generating the outline of one side of the fuselage may be used for the top and side views. This signal is available from the output of amplifier A6 in FIG. 5. One may be tempted to use the fuselage signal generated in balanced modulator A11 instead of the outline of half the fuselage available from amplifier A6. However, using the balanced modulator A11 output is not desirable, as the nose end view of the aircraft are desired to be implicit in the top and side views modulated envelope-forming signals. Since the fuselage has a circular cross-section (minus the canopy), the sinusoidal signals representing the top and side views of the aircraft are desired to be in quadrature to obtain the required implicit nose end view.

FIG. 6 shows a block diagram of the side view signal generating arrangement. Balanced modulator A21 has as one input the same DC composite sum signal FB2 of the three components describing the outline of the fuselage for the top view as a function of time. The other input to the balanced modulator A21 is a sinusoidal signal sine $\phi^{\pi/2}$ derived from the wave shape generator 31A shown in FIG. 2, and being in quadrature with that signal sine $\phi°$ used for forming the top view signal FH. At the output of the balanced modulator one obtains a modulated envelope-forming AC signal FS, whose instantaneous amplitude and polarity is proportional to the instantaneous product of the two applied signals FB2 and sine $\phi^{\pi/2}$. As with the top view the result is an envelope-forming sinusoid whose amplitude varies dynamically and will scan a solid image of the fuselage of the aircraft in FIG. 3 when viewed as a function of time.

Consider now the canopy of the aircraft in FIG. 3. Its cross section is such that when viewed from the nose end of the aircraft it presents an elliptical shape to the top half of the fuselage. An elliptical-shaped lissajous figure may be approximated by applying two sinusoids of different amplitude and in quadrature to a pair of mutually perpendicular deflection plates on a cathode-ray tube. However, only the top half of the fuselage contains the canopy, and the desired shape is obtained by the addition in time-overlapping timed phase relation of a sinusoid to the top half of the fuselage only. Points at which the canopy contour changes are T-16 and T-20. A pulse occurring at those times is generated by NAND gates G13 and G14. The canopy signal generator 103 is shown schematically in FIG. 6, and comprises generally ramp generator RG5, which may be identical to ramp generator RG1, with associated voltage-dropping resistor R50, amplifier A16, resistor R51, flip-flops FF10 and FF6, and NAND gates G4, G6, G13 and G14. The canopy is simulated by signal C, forming a ramp starting at T-16 and ending at T-20. A gradual decay of the ramp amplitude occurs from T-20 to T-77. Flip-flop FF10 is set at T-16, thereby enabling ramp generator RG5. As mentioned before, a linear rammp voltage is generated across C7, its slope set by resistor R50. At T-50 flip-flop FF10 is reset, thereby turning ramp generator RG5 off. The charging current to C7 is removed. A shunt resistor R51 across capacitor C7 discharges C7 between T-20 and T-77. At T-77 transistor Q5 is turned on, shorting C7 to insure that it charges from 0V during the next cycle. Amplifier A16 buffers the voltage developed across capacitor C7. Its output represents the outline of the canopy portion of the aircraft side view as a function of time and is applied to one input of balanced modulator A18. In the previous balanced modulators a symmetrical signal was applied as the AC carrier input to the balanced modulator. In each of those previous cases a symmetrical object was being simulated; for the wings, there are symmetrical right and left wings, and the fuselage top view is symmetrical about its centerline from nose to tail. However, the fuselage side view is not symmetrical about its centerline from nose to tail. The canopy, in particular, is only on the top of the fuselage. A half-sinusoidal signal phased such as to add in time-overlapping relation to the top half of the previously generated fuselage modulated envelope-forming signal FS is utilized. Diode CR7 allows the positive portion of the phase $\pi/2$ sinusoid $\phi^{\pi/2}$ to be applied to the other input of balanced modulator A18. The output CS of A18 is a series of half sine waves whose envelope approximates the contour of the canopy.

Consider now the vertical stabilizer of the aircraft in FIG. 3. The same general method used for forming the wings and horizontal stabilizer signals is employed to form the vertical stabilizer signals, with the exception of symmetry. Since the vertical stabilizer is only on the top of the fuselage as seen from the side view, the same technique for asymmetrical signal generation used in the canopy generation is carried into the vertical stabilizer. Vertical stabilizer signal generator 105 generally comprises ramp generator RG6 (which may be identical to ramp generator RG3), with associated resistors R52, R53, amplifier A17 and associated resistors R54, R55, R56, diode CR6, flip-flop FF11, and NAND gates G15 and G6. Flip-flop FF11 is set at T-56, enabling ramp generator RG6 to charge through R52 and R53. Zener diode CR6 truncates the ramp so as to simulate the nearly flat top vertical stabilizer section. Amplifier A17, a unity gain amplifier, inverts and buffers the voltage developed across C8 and applies it to one input of balanced modulator A20. A triangular wave signal, saw $\phi^{\pi/2}$, having a $\pi/2$ phase reference is applied to scan generator SG3, which may suitably be identical to scan generator SG1. As with the wing scan generators, only the top 9 percent of the triangular wave is used. Due to the asymmetry of the vertical stabilizer, only the positive portion of the triangular wave, saw $\phi^{\pi/2}$, is needed. The scan generator SG3 output is applied as the second input to balanced modulator A20. The output VSS of A20 is a series of positive triangular wave peaks whose envelope generally approximates the contour of the vertical stabilizer.

The outputs FS, CS and VSS of balanced modulators A21, A18 and A20 represent the fuselage, canopy and vertical stabilizer respectively as seen from the side. These three signals are summed in summing amplifier A19. The summing resistors are selected such that the voltage ratio of fuselage diameter to canopy or vertical stabilizer is the same as the dimension ratio of the aircraft in FIG. 3 and the output voltage swing is within the capabilities of the amplifier selected. The dimension ratio of the aircraft fuselage radius to the maximum vertical dimension above the centerline is 3.4/12.5 or 0.27. In selecting the summing resistors for A19, two somewhat arbitrary decisions may be and are made: (1) the value of feedback resistor R61 is selected as 10K and (2) the maximum vertical dimension is to be represented by 13V pk. If the maximum vertical signal is 13.0V then the maximum fuselage diameter is 2(0.27 × 13) or fV = 7V P−P. The fuselage output voltage from modulator A21 is 10.5 V P−P at the maximum diameter, therefore a gain of 7/10.5 or 0.64 is required in A19. The summing resistor R60 value is then 10K/0.64 or 15.4K. Similarly the dimension ratio of the canopy height to the maximum vertical dimension above the centerline is 2.5/12.5 or 0.2. This requires a canopy contribution to the output voltage of 0.2 = cV/13 or cV = 2.6V pk. The canopy output voltage from modulator A18 is 4.65V peak at the maximum height, therefore a gain of 2.6/4.65 or 0.56 is required in A19. The summing resistor R58 value is then 10K/0.56 or 17.8K. In a likewise manner, the dimension ratio of the vertical stabilizer height to the maximum vertical dimension is 7.45/12.5 = 0.598. This requires a vertical stabilizer contribution to the total output voltage of 0.598 = sV/13.0 or sV = 7.77V. The vertical stabilizer output voltage from modulator A20 is 7.7V P−P at the maximum height, therefore a gain of 7.77/7.7 or 1.01 is required in A19. The summing resistor R59 value is then 10K/1.01 or 9.9K. The output of amplifier A19 forms a modulated envelope-forming AC composite signal S whose amplitude varies dynamically as a function of time. The envelope of this signal S traces the side view outline of the aircraft shown in FIG. 3 when viewed as a function of time, and the combination of sinusoidal waves with thusly time-overlapping timed phase portions of triangular waves summed to the sinusoidal waves gives the illusion of a solid image. As with the top view, the presentation of the side view on a cathode-ray tube, FIG. 6C, requires the side view signal from amplifier A19 to be applied to the vertical deflection plates and a ramp starting at T-1 and ending at T-77 to be applied to the horizontal deflection plates. The cathode-ray tube beam is blanked of between T-77 and T-1.

As has been mentioned, by following the method and wave form generation arrangement discussed above, with care being taken in forming and maintaining the phase relationships and wave forms used in the generation of the top and side views of the aircraft and as discussed above, then the front view can be made implicit in those views. Presentation of the front view silhouette requires attenuation of the side view signal, since the side and top views are generated with different scale factors. FIG. 6D shows the equipment configuration for a front view presentation and is similar to the side view presentation. Computation of the attenuator for the side view is computed by ratio and proportion. For the side view signal S, 13V is equal to 12.5 imaginary divisions while for the top view Signal U, 10.0V is equal to 19.2 imaginary divisions. Therefore deflector amplifier A25 constant is $$K = \frac{10}{19.2} \cdot \frac{12.5}{13} = 0.5$$

relative to the constant for amplifier A24.

Apparent size of the image may be varied by varying the X and Y axes inputs to the cathode-ray tube display by an equal amount. Reduction of the X and Y axes inputs will cause a smaller image to be formed. Conversely, an increase in signal amplitude to the X and Y inputs will cause a larger image to be formed. Range effects may be thus simulated by controlling the X and Y input signals as a function of (1/R) where R is a range analog voltage. Mechanization of range effects is described later.

When the aircraft image is displayed at a minimum range, on a 5-inch cathode-ray tube, it is possible to see the individual scan lines in the illustrative example. A greater ramp to sinusoid period ratio may be selected to place the scan lines closer together, but this is limited by the two extremes. A longer ramp period is limited by flicker seen by the observer, while a shorter sinusoid period requires greater bandwidth in the amplifiers and modulators.

It is possible to obtain an apparent higher scan ratio by interlacing the scan lines. This may be accomplished by delaying the ramp start time one-half of the AC carrier period every other scan, thus giving the illusion of a 2:1 increase in apparent scanning lines. The same technique may be carried even further by further closer interlacing, using the same method, to give an even greater apparent scanning line ratio. FIG. 2 is a block diagram illustrating a method and apparatus for obtaining a 2:1 interlaced scan. Gates G1 and G2 are NAND gates and are alternated on and off in sequence. Gate G3 is a NOR gate and passes the 23.625 kHz clock to the BCD decade counters through inverting amplifier I1. The first BCD decade counter generates a carry pulse on every ten input clock pulses. The second BCD decade counter generates a carry pulse on every 100 input clock pulses, thus flip-flop FF4 is toggled into alternate states on every 100 clock pulses causing a group of 100 $\phi°$ or $\phi^\pi$ clock pulses to be alternately input to the BCD decade counters. Any particularly count between 01 and 100 then shifts one-half a time increment with respect to the sawtooth and sine wave forms every other image scan.

As the image thus generated is, in the illustrative example, caused to be displayed on a cathode-ray tube, a variation in the apparent intensity of various sections of the image caused by variations in the beam writing speed could be disconcerting. The sum of the absolute value of the first derivative of the two applied X and Y deflection signals applied to the cathode-ray tube control grid bias would cause the beam current to increase as the beam writing speed varies such that the apparent intensity of all parts of the image might be made constant regardless of beam writing speed. There are, however, certain simplifications which can be made, and instead of performing the differentiation, intensifying pulses can be generated to occur during periods of very fast beam speeds and generally proportional to the amplitude of the particular signal causing the instant fast beam speeds. Such an approach is utilized here. Intensifying pulses generated during wing and vertical and horizontal stabilizers are added to some D.C. level, both of which are caused to vary in value as a function of image size being displayed, (e.g., in the case of an aircraft), as a function of simulated inverse range 1/R.

In operation, the vertical stabilizer scan wave form from SG3 is amplified in a saturating switch, transistor Q10, as shown in FIG. 7. Resistor R65 and R66 are current limiting resistors. Transistor Q11 is operated in a saturated switching mode also; however, its collector supply voltage is the vertical stabilizer wave form VS, so that the resultant signal on the collector of Q11 is a series of pulses whose width corresponds to the width of the vertical stabilizer scan and whose amplitude varies as a direct function of the beam deflection; (i.e., the instantaneous height of the vertical stabilizer). Transistor Q12 and associated resistors R68 and R69 form a unity gain inverting amplifier.

In a similar manner, the scan generator wave forms WSC1 and WSC2 for the wings are squared in saturating amplifiers Q14, Q15 and Q16 and OR'ed by virtue of a common collector load R74. Transistor Q17's collector supply voltage is the wing and horizontal stabilizer wave form, so that the resultant signal on the collector of Q17 is a series of pulse whose width corresponds to each of the wing's scan and whose amplitude varies as a direct function of the beam deflection; (i.e., the instantaneous amplitude of the wing or horizontal stabilizer signals). Transistors Q13 and Q18 are emitter followers with a common emitter load resistor R77. These transistors are selected for a high $V_{BE}$ reverse voltage rating, so they may be utilized for OR'ing the two sets of pulses.

The resulting intensifying pulses are multiplied by a voltage which varies as a function of image display size (i.e., range). Resistor R79 and potentiometer R78 allow adjustment of the slope and baseline of the inverse range voltage applied to multiplier A26. The output of multiplier A26 then has pulses which occur during periods of rapid beam deflection and whose amplitude varies directly as the rate of deflection, to a practically satisfactory extent for beam intensity compensation.

As will be shown shortly, if the image is oriented about different axes for viewing, a variation in intensity can be observed if the aspect ratio of the image is other than 1:1. In the case of the illustrative aircraft image generated in the illustrative embodiment, the length of the aircraft is significantly greater than either the width or height. To compensate for the resulting intensity variation with orientation the $T_V$ and $T_H$ Euler coefficients (discussed in detail later) are applied to an absolute value generator so that a $T_V$ and $T_H$ signal which is always positive can be used to intensify the entire image whenever its attitude is such as to expose the top or side view of the aircraft. The absolute value generators, AVG1 and AVG2 are identical. Amplifier A27 is a unity gain inverting amplifier, but is capable of passing only negative input signals, by virtue of diode CR10 shunting the feedback resistor R82. Resistors R80 and R83 are selected to have a two-to-one ratio between them, such that when $T_V$ is a positive voltage the output from amplifier A27 is close to zero volts and the input current to the summing junction of amplifier A28 is that from R80 alone. If $T_V$ is a negative voltage, amplifier A27 presents an equal but opposite polarity voltage to resistor R83. Since resistor R83 is half the value of resistor R80 its current contribution will be twice as much as R80, the net effect is a positive current equal to that which would be obtained if the input were a positive voltage.

Amplifier A28 sums the side and top aspect voltages with a voltage that varies inversely with range, to provide a D.C. level which can be used to intensify the image as it becomes larger on the display. Inverter I5 is a linear inverting amplifier, and R88 allows adjustment of the intensifying D.C. effects.

During periods of retrace, it is desirable to blank the electron beam in the cathode-ray tube. Gate T1-T77 has the proper polarity and is summed with the intensifying D.C. level and intensifying pulses in a noninverting summing amplifier A29. Resistors R89, R90, R91 and R92 are empirically chosen to suit the characteristics of the particular display cathode-ray tube employed. A composite intensity control signal is thus generated. In one illustrative example, zero volts was chosen as gray, +1 volt is full intensity and −1 volt as full blanking.

Up to this point in the discussion, means have been described for varying the aircraft image in size as a function of range, and for displaying such along its major axes; (i.e., nose view, tail view, top view, bottom view, right side or left side). It is often of value to be able to present an aircraft image not only along a plane through two mutually perpendicular major axes, but also at other intermediate attitudes. Considering the geometrical relationships defining a target (aircraft image) and an observer, as indicated diagrammatically in FIG. 9, one may formulate a set of equations by employing a series of five coordinate transformations so that a three dimensional target can be projected onto a plane which is perpendicular to the observers line of sight. The following definitions are given:

$\theta$ = azimuth angle measured positive CCW in the reference plane from north.

$\phi$ = elevation angle measured positive up in the reference plane from the horizon.

$\psi$ = roll angle measured positive CCW (left turn) in the target plane of reference from horizontal flight.

$\alpha$ = yaw angle measured positive CCW (North to West) in the target plane of reference from due north.

$\gamma$ = pitch angle measured positive up in the target plane of reference from horizontal flight.

The first three coordinate transformatins rotate the target reference coordinates into the observers coordinate system. This set of transformations is referred to in the literature, (see Mathematical Handbook for Scientists and Engineers, Korn & Korn, McGraw Hill 1961 Section 14. 10-3 and -4, and Handbook of Physics, Condon and Odishaw, McGraw Hill 1958 Pages 2-4 through 2-6) the resultant components of which represent the direction cosines. In this particular case the order of rotation was chosen to be yaw, pitch and then roll. In a similar manner, the observers frame of reference is then transformed to the observers line of sight by rotating through the observers azimuth and then his elevation angle. If we define any location in the observers field of view as O, $Y_5$, $Z_5$ the actual target coordinates as measured in the ($X_3$, $Y_3$, $Z_3$) coordinate system may now be expressed as:

$Y_5 = [\sin\theta (\cos\alpha \cos\psi - \cos\alpha \sin\gamma \sin\psi) + \cos\theta (\cos\alpha \cos\psi + \sin\alpha \sin\gamma \sin\psi)]X_3 + [-\cos\theta (\sin\alpha \cos\gamma) + \sin\theta (\cos\gamma \cos\alpha)]Y_3 + [-\cos\theta (\cos\alpha \sin\psi - \sin\alpha \sin\gamma \cos\psi) - \sin\theta (\sin\psi \sin\alpha + \cos\alpha \sin\gamma \cos\psi)]Z_3$ $Z_5 = [\sin\phi \sin\theta (\cos\alpha \cos\psi + \sin\alpha \sin\gamma \sin\psi) - \sin\phi \cos\theta (\sin\alpha \cos\psi - \cos\alpha \sin\gamma \sin\psi) + \cos\phi \cos\gamma \sin\psi]X_3 + [\sin\phi(-\sin\theta \sin\alpha \cos\gamma - \cos\theta \cos\gamma \cos\alpha) + \cos\phi \sin + [-\sin\phi \sin\theta (\cos\alpha \sin\psi - \sin\alpha \sin\gamma \cos\psi) + \sin\phi \cos\theta (\sin\alpha \sin\psi + \cos\alpha \sin\gamma \cos\psi) + \cos\phi \cos\psi \cos\gamma]Z_3$ Equation $Y_5$ represents the horizontal component of the image as seen from the observers frame of reference, (i.e., his eye). Similarly, equation $Z_5$ represents the vertical component of the image. The key factor here now is the interpretation of the terms in equations $Y_5$ and $Z_5$. If one were to keep in mind the aircraft image generation previously explained and the fact that the three dimensions of the aircraft image were described by two signals in quadrature dynamically varying in a periodic manner as a function of time, one can see that the image's three dimensions are described by three electrical signals and that each of the three electrical signals may be acted on separately. Examination of equations $Y_5$ and $Z_5$ indicates three terms in each which describe the sign and size of each axis of the aircraft as projected onto the horizontal and vertical plane respectively, normal to the gunners eye. The three electrical signals representing the three dimensions of the aircraft are: $X_3$, $Y_3$ and $Z_3$. $X_3$ being the instantaneous width of the aircraft, $Z_3$ being the instantaneous height of the aircraft and $Y_3$ being the time reference along the length of the aircraft in which $X_3$ and $Z_3$ are programmed in amplitude.

The six coefficients to be solved are:

$U_H = +\sin\theta](\sin\alpha \cos\psi - \cos\alpha \sin\gamma \sin\psi) + \cos\theta (\cos\alpha \cos\psi + \sin\alpha \sin\gamma \sin\psi)$ $T_H = -\cos\theta (\sin\alpha \cos\gamma) + \sin\theta (\cos\gamma \cos\alpha)$ $S_H = -\cos\theta (\cos\alpha \sin\psi - \sin\alpha \sin\gamma \cos\psi) - \sin\theta (\sin\psi \sin\alpha + \cos\alpha \sin\gamma \cos\psi)$ $U_V = \sin\theta [+\sin\theta (\cos\alpha \cos\psi + \sin\alpha \sin\gamma \sin\psi) - \cos\theta (\sin\alpha \cos\psi - \cos\alpha \sin\gamma \sin\psi)] + \cos\theta \cos\gamma \sin\psi$ $T_V = \sin\theta [-\sin\theta \cos\alpha - \cos\theta \cos\gamma \cos\alpha] + \cos\theta \sin\gamma$ $S_V = \sin\theta [-\sin\theta (\cos\alpha \sin\psi - \sin\alpha \sin\gamma \cos\psi) + \cos\theta (\sin\alpha \sin\psi + \cos\alpha \sin\gamma \cos\psi)] + \cos\theta \cos\gamma \cos\psi$ Synthesis of these six coefficients may be suitably accomplished in several ways utilizing the present state of the art; straight-forward mathematical solution in a suitably programmed digital computer, or by suitable analog signal arrangements employing various conventional electromechanical rotary devices using resolvers or sine/cosine potentiometers, or by the use of operational amplifier modules which generate sine and cosine analog signals and perform multiplying and summing functions.

The six coefficients when solved, may be employed in any conventional or other desired manner to provide bipolar variable amplitude D.C. signals. The coefficient voltages thus provided are multiplied with the corresponding aircraft signal representing that axis and then summed, as shown in FIG. 8B. Resistors R93 through R96 and R98 through R101 set the scale factors of the sweep, top and side aircraft views of each axis such that the resultant signal amplitude ratios bear the same relationship as the actual aircraft dimension ratios.

Range is simulated by simultaneously varying the output amplitude of amplifiers A33 and A39. Image size varies as a function of 1/R, where R is range. An analog voltage representing 1/R may be obtained as an output from a digital computer if the flight path is solved digitally, or may be solved from an operational divider module if the flight path is solved in an analog computer. Target range voltage varies linearly with range and is applied to operational divider module A34. The numerator scale factor is set by a voltage divider. The resultant analog output of A34 varies as an inverse function of the input voltage and is applied to two operational multiplier modules A35 and A40. The signals representing aircraft image in the horizontal ($I_H$) and vertical ($I_V$) plane are applied to multipliers A40 and A35 respectively. The outputs of multipliers A40 and A35 vary in amplitude as a function of 1/R and are summed with a tracking error signal in noninverting amplifiers A41 and A42 respectively. The tracking error signal causes a displacement of the image from the center of the display cathode-ray tube, as a function of the difference in the target's spatial coordinates and those of the observer.

Observer's field of view is determined by the display optics. Amplifiers A41 and A42 have their summing resistors selected so as to provide deflection voltages to the display cathode-ray tube commensurate with tracking angle error and target apparent range. Various optical arrangements may be utilized with the cathode-ray tube, if desired, such as half silvered mirrors oblique to the view angle of the observer, to provide a virtual image of the aircraft against a real background, as such is viewed by the observer.

In some instances it may be desirable to have the image displayed in a television format conforming to EIA Standard RS-170, enabling utilization of commercially available recording and display apparatus. In addition, generally, more high intensity displays are available in TV format than any other scan. For this reason a scan converter may be added to the system in place of the cathode-ray tube display.

While the invention has been illustrated in various aspects and forms and as embodied in a physical embodiment in accord therewith, it will be apparent that various modifications and improvements may be made without departing from the scope and spirit of the invention. For instance, the method described here for obtaining an image of an aircraft is not limited to the illustrative complex silhouette or outline object, which for illustrative purposes is an aircraft. Other less or more complex objects may be simulated by using the same general techniques and simulated images and displays of more than one such object or various objects may be effected according to this invention. It will be appreciated that more detail requires greater bandwidth and attention must be paid to phase shift and its resultant distortion in the desired image. It will also be appreciated that other display devices than a cathode-ray tube may be suitably employed. Other potential display devices include a laser having a means of orthogonal deflection for large screen displays. Time sharing or other techniques may be used to permit display of more than one moving and/or stationary image as may be desired. Also, while sine and triangular wave forms have been utilized as modulated A.C. carriers for the outline modulated, envelope-forming signals, other A.C. carrier wave forms may be employed for other particular object and/or area configurational outline needs, such as a square wave carrier alone or in combination with sine and/or triangular carrier wave forms. Accordingly, the invention is not to be limited by the particular illustrative embodiment, but only by the scope of the appended claims.

I claim:

1. Image signal forming means, comprising
    means for forming a first analog envelope-forming signal, the effective envelope amplitude of which varies in time as a function of a sectional outline bounding a portion of a first area desired to be imaged,
    means for forming a second analog envelope-forming signal in time-overlapping timed phase relation with said first signal and the effective envelope amplitude of which varies in time as a function of a further sectional outline bounding a portion of a respective second area desired to be simultaneously imaged,
    means for adding said first and second signals and for forming as a function thereof a composite envelope-forming signal the effective envelope of which varies in time as a function of both of said first and second areas,
    means for forming a common time reference ramp trace-sweep signal in time-overlapping relation with, and for use in common with, said composite envelope-forming signal to effect trace movement in a direction transverse to trace movement effected by said composite envelope-forming signal,
    means for generating an A.C. carrier signal varying through multiple repetitive cycles within the time span duration of one occurence of said common time ramp reference signal,
    and means for producing an envelope image-forming signal formed of repetitive cycles corresponding in frequency to said A.C. carrier signal, the successive peak-to-peak amplitude of which repetitive cycles is a function of said composite envelope-forming signal.

2. Image signal forming means according to claim 1, said second signal representing an area bounding and contiguous with at least one side of the area represented by said first signal.

3. Image signal forming means according to claim 2, at least one of said areas being irregular in configuration, and the composite area defined by said two continguous areas being irregular.

4. Image signal forming means according to claim 2, said two areas being different in shape from one another.

5. Image signal forming means according to claim 4, said two areas being different in configuration, and one of said areas being asymmetrical in configuration.

6. Image signal forming means according to claim 2, one of said areas being symmetrical about a selected dimensional coordinate axis extending therethrough.

7. Image signal forming means according to claim 6, the second of said areas being asymmetrical relative to said selected dimensional coordinate axis.

8. Image signal forming means according to claim 7, said second area having a portion of its contiguous bounding line spaced from said selected dimensional coordinate axis.

9. Image signal forming means according to claim 2, said two areas being symmetrical about a common dimensional coordinate axis.

10. Image signal forming means according to claim 1, said second signal representing an area bounding and contiguous with a portion of two opposite sides of the area represented by said first signal.

11. Image signal forming means according to claim 1, said two areas being different in configuration, and one of said areas being asymmetrical in configuration.

12. Image signal forming means according to claim 1, said areas representing a desired composite area of a three-dimensional object being simulated, as viewed in two coordinate transverse axes X and Y, and said composite envelope-forming signal being an analog function of the dimension of the composite said first and second areas along one of said axes as scanned along the other of said two transverse axes,
    said object also being viewable in a further two dimensional Y and Z coordinate axis presentation,
    and means for forming a further analog envelope-forming signal in time-overlapping quadrature phase relation relative to said first and second signals, and the effective envelope of which varies in time as a function of the outline of a portion of said first and second areas as viewed in said Y and Z coordinate axis presentation.

13. Image signal forming means according to claim 12,
    and means for selectively apportioning respective portions of said first mentioned composite and said further analog envelope-forming signals as a function of desired image presentation attitude of said simulated object.

14. Image signal forming means according to claim 13,
said apportioning means being responsive to Euler transform inputs thereto to effect said selective apportioning.

15. Image signal forming means according to claim 12,
the outline of said first and second areas as viewed in a further X and Z coordinate axis being implicit in said two envelope-forming signals.

16. Image signal forming means according to claim 1, and means for modifying the amplitude of said composite envelope-forming image signal as an inverse function of simulated range of said first and second areas from a location external of and spaced from said first and second areas and which may correspond to the location of a theoretical observer.

17. Image signal forming means according to claim 1, said first and second means for forming respectively said first and second analog envelope-forming signals comprising:
respectively first and second D.C. analog signal-generating means, the amplitude of a D.C. output signal therefrom varying in time within a given time period as a function of one mirror half of the respective outline of said first and second areas,
and means for forming and modulating respective A.C. carrier signal having multiple respctive cycles within said given time period, with each respective one of said first and second D.C. output signals to form the respective said two envelope signals.

18. Image signal forming means according to claim 1, each of said first and second means for forming respectively said first and second time-overlapping analog envelope-forming signals comprising:
first and second time-overlapping D.C. analog signal generating means, the amplitude of a respective first and second D.C. analog output of each varying in time with a given time frame as a function of one mirror half of the respective outline of said first and second areas,
means for summing said first and second time-overlapping D.C. analog outputs, to produce a summed D.C. signal,
means for forming an A.C. carrier signal having multiple respective cycles within said given time frame,
and means for modulating said A.C. carrier signal with said summed D.C. signal to produce said composite envelope signal.

19. Image signal forming means according to claim 1, and means for forming a trace image on an X-Y display including means for effecting trace displacement in one direction as a function of said common time reference trace sweep signal, and means for effecting trace displacement in a direction transverse to said first direction as a function of amplitude of said composite envelope image-forming signal during concurrent occurrence of said modulated A.C. carrier envelope-forming signal to thereby form a visual envelope trace image having an area bounding envelope outline of which a portion varies with and conforms to said combined areas.

20. Image signal forming means, comprising
means for forming a first analog envelope-forming signal, the effective envelope amplitude of which varies in time as a function of a sectional outline bounding a first area desired to be imaged,
means for forming a second analog envelope-forming signal in time-overlapping relation with said first signal and the effective envelope amplitude of which varies in time as a function of a further sectional outline bounding a respective second area desired to be imaged,
means for combining said first and second signals to form a composite envelope-forming signal varying in time as a function of both of said first and second areas,
said second signal representing an area bounding and contiguous with at least one side of the area represented by said first signal,
means for forming a third discrete analog envelope-forming signal in time-overlapping relation with said first and second signals, and the effective envelope amplitude of which varies in time as a function of a third sectional outline bounding a respective third area desired to be imaged in composite form with said first and second areas,
means for combining said first and second signals with said third signal and for forming a composite envelope-forming signal the effective envelope of which varies in time as a function of the composite said first, second, and third areas,
means for forming a common time reference trace-sweep signal in time-overlapping relation with, and for use in common with said composite envelope-forming signal to effect trace movement in a direction transverse to trace movement effected by said composite envelope-forming signal,
means for generating an A.C. carrier signal varying through multiple repetitive cycles within the time span duration of one occurrence of said common time ramp reference signal,
and means for producing an envelope image-forming signal formed of repetitive cycles corresponding in frequency to said A.C. carrier signal, the successive peak-to-peak amplitude of which repetitive cycles is a function of said composite envelope-forming signal.

21. Image signal forming means according to claim 20,
one of said areas being irregular.

22. Image signal forming means according to claim 21,
one of said areas being asymmetrical relative to said selected coordinate axis.

23. Image signal forming means according to claim 20,
one of said areas being symmetrical about a selected dimensional coordinate axis running therethrough.

24. Image signal forming means according to claim 20,
and means for forming a trace image on an X-Y display including means for effecting trace displacement in one direction as a function of said common time reference trace sweep signal, and means for effecting trace displacement in a direction transverse to said first direction as a function of amplitude of said composite envelope image-forming signal during concurrent occurrence of said modulated A.C. carrier envelope-forming signal to thereby form a visual envelope trace image having an area bounding envelope outline of which a portion varies with and conforms to said combined areas.

25. Image signal forming means, comprising means for forming a first analog envelope-forming signal, the effective envelope amplitude of which varies in time as a function of a sectional outline bounding a first area desired to be imaged, means for forming a second analog envelope-forming signal in timed phase with said first signal and the effective envelope amplitude of which varies in time as a function of a further sectional outline bounding a respective second area desired to be imaged, means for algebraically adding said first and second signals to form a composite envelope-forming image-forming signal the effective envelope amplitude of which varies in time as a function of both of said first and second areas, means for forming an image intensification signal, and dynamically variable self-varying means for varying said image intensification signal as a function of rate of change in amplitude of said composite signal.

26. Image signal forming means, comprising means for forming a first analog envelope-forming signal, the effective envelope of which varies in time as a function of a sectional outline bounding a first area desired to be imaged, means for forming a second analog envelope-forming signal in timed phase with said first signal and the effective envelope of which varies in time as a function of a further sectional outline bounding a respective second area desired to be imaged, means for algebraically adding said first and second signals to form a composite envelope-forming signal varying in time as a function of both of said first and second areas, said first and second signals being modulated A.C. carrier signals having the same phase, and means forming a further envelope-forming modulated A.C. carrier image-forming signal of substantially the same A.C. carrier frequency and in quadrature with said composite envelope-forming image-forming signal, and representing an area of an object desired to be imaged and as viewed at right angle to the viewing angle normal to the first mentioned first and second areas as represented by said composite envelope-forming signal.

27. Image signal forming means according to claim 26, said further envelope-forming signal being a composite signal formed as a function of two component signals representative of component areas defined by said further composite envelope-forming signal.

28. Image signal forming means according to claim 27, one of said two area-representative component signals from which said further composite envelope-forming signal is derived being common to one of the area-representative component signals from which said first mentioned composite signal is formed.

29. Image signal forming means, comprising means for forming a first analog envelope-forming signal, the effective envelope of which varies in time as a function of a sectional outline bounding a first area desired to be imaged, means for forming a second analog envelope-forming signal in phase with said first signal and the effective envelope of which varies in time as a function of a further sectional outline bounding a respective second area to be imaged, means for algebraically adding said first and second signals and for forming as a function thereof a composite envelope-forming modulated A.C. carrier signal the effective modulation envelope of which varies in time as a function of both of said first and second areas, a two-dimensional X-Y imaging device having X and Y coordinate axis trace displacement inputs, and means for forming a further image-trace-dimensional-displacement ramp signal in timed relation to said composite envelope-forming modulated A.C. carrier signal, said ramp signal being of a duration at least as long as the duration of said composite envelope-forming modulated A.C. carrier signal for one complete area-representative signal representation by said envelope-forming modulated A.C. carrier signal, and being connected for effective feeding to one of the respective X and Y coordinate displacement axis inputs of said two-dimensional imaging device, said composite envelope-forming signal being connected for effective feeding to the other of said X and Y coordinate displacement axis inputs of said two-dimensional imaging device to thereby form an envelope image trace on said X-Y imaging device, the outline of which varies as a function of said composite envelope-forming modulated A.C. carrier signal in one coordinate direction and of said ramp signal in a direction transverse to said one coordinate direction.

30. Image signal forming means according to claim 29, said composite envelope-forming signal and said further image-trace-dimensional-displacement ramp signal being cyclically repetitive in timed interrelation, and said composite envelope-forming signal comprising an AC signal train modulated as a function of the dimension of the composite said first and second areas along one of said coordinate axes, and which modulated AC signal train is cyclically repetitive through multiple cycles within a single repetitive cycle of said further image-trace-dimensional displacement signal.

31. Image signal forming means according to claim 30, further comprising dynamically variable self-varying image intensity varying means varying in intensity signal compensation as a dynamic function of the amplitude of said composite envelope-forming signal to vary the instant intensity of the image corresponding to said composite envelope-forming signal.

32. Image signal forming means, comprising means for forming first and second lissajous trace signals, said first signal being an A.C. carrier signal, representative in time progressive peak-to-peak amplitude of the outline of a first area, means for forming a third modulated A.C. carrier envelope-image-forming lissajous trace signal which is in phase with and in time-overlapping relation with said first lissajous trace signals and which together with said second lissajous trace signal is representative in time progressive peak-to-peak amplitude of an outline of a second area, means for algebraically adding said first and third lissajous trace signals to form a composite fourth modulated A.C. carrier lissajous image trace-forming signal the peak-to-peak envelope of which together with said second lissajous trace signal is representative of a composite outline of the sum of said first and second areas, said means for forming second lissajous trace signal comprising means for forming a common time reference ramp trace-sweep signal, a single ramp occurrence duration of which is at least as long as the duration of one complete area representation by a plurality of modulated cycles of said fourth modulated A.C. carrier signal.

33. Image signal forming means according to claim 32, and image display means having image display forming means responsive to said second ramp signal and said composite fourth lissajous image trace signals to thereby form a trace envelope image showing a plurality of repetitively sweeping trace lines sequentially incrementally displaced as a function of said ramp signal in a direction transverse to the direction of said repetitive sweeping, and the envelope amplitude of which repetitively sweeping trace lines is a function of the amplitude of said composite modulated A.C. carrier lissajous image-forming signal.

34. Image signal forming means according to claim 33, and means for rotational transformation of the envelope trace image signal formed in response to said second and composite fourth lissajous trace signals.

35. Image signal forming means according to claim 33, and dynamically self-varying compensation means for dynamic variation of image trace intensity as a dynamic function of the velocity of trace displacement.

36. Image signal forming means, comprising means for forming time-overlapping first and second D.C. signals at least one of which varies and which together with their respective opposite mirror image signals are representative in amplitude of a composite area desired to be imaged, means for combining said time-overlapping first and second D.C. signals to form a composite D.C. signal which together with its opposite mirror image signal is representative in amplitude of the composite outline of said composite area, and means for combining said first and second D.C. signals with an A.C. signal having a frequency repetition rate such that a plurality of cycles occur within the time duration of a single occurrence of said first and second D.C. signals to form an envelope-forming signal comprising a plurality of cycles the successive cycles of which vary in envelope peak-to-peak amplitude as a function of the composite outline of said first and second areas, for feeding to an image-forming device to effect envelope image formation as a function thereof.

37. Image signal forming means, comprising means for forming first and second D.C. signals at least one of which varies and which together with their respective opposite mirror image signals are representative in amplitude of a first composite area desired to be imaged, means for combining said first and second D.C. signals to form a composite D.C. signal which together with its opposite mirror image signal is representative in amplitude of the composite outline of said first composite area, means for combining said composite D.C. signal with an A.C. signal having a frequency repetition rate such that a plurality of cycles occur within the time duration of a single occurrence of said composite D.C. signal to form a first modulated A.C. composite envelope-forming signal comprising a plurality of cycles the successive cycles of which vary in envelope peak-to-peak amplitude/time as a function of the outline of said first composite area, for feeding to an image-forming device to effect envelope image formation as a function thereof, means for forming a third D.C. signal representative in amplitude of a further area desired to be imaged, means for combining said third D.C. signal with a respective A.C. signal in phase with said first-mentioned A.C. carrier signal to form a respective second modulated A.C. envelope-forming signal respectively varying in envelope peak-to-peak amplitude as a function of the respective amplitude of said third D.C. signal, and means for combining said first and second modulated A.C. envelope-forming signals to form a further composite in-phase envelope-forming modulated A.C. signal varying in envelope peak-to-peak amplitude as a function of the composite amplitude of said first and second modulated A.C. envelope-forming signals and the composite outline of said first composite area and said further area for feeding to an image-forming device to effect envelope image formation as a function thereof.

38. Image signal forming means, comprising means for forming first and second D.C. signals at least one of which varies and which together with their respective opposite mirror image signals are representative in amplitude of a first composite area desired to be imaged, means for combining said first and second D.C. signals to form a composite D.C. signal which together with its opposite mirror image signal is representative in amplitude of the composite outline of said first composite area, means for combining said first and second D.C. signals with an A.C. signal having a frequency repetition rate such that a plurality of cycles occur within the time duration of a single occurrence of said first and second D.C. signals to form a first modulated A.C. envelope-forming signal comprising a plurality of cycles the successive cycles of which vary in envelope peak-to-peak amplitude/time as a function of the composite outline of said first composite area, for feeding to an image-forming device to effect envelope image formation as a function thereof, means for forming third and fourth D.C. signals representative in amplitude/time of a further composite area desired to be imaged, means for in-phase combining each of said third and fourth D.C. signals with respective A.C. signals having the same repetition frequency rate and which rate is such that a plurality of cycles thereof occur within the time duration of a single occurrence of said third and fourth D.C. signals to form representative third and fourth envelope-forming modulated A.C. signals respectively varying in envelope peak-to-peak amplitude as a function of the respective amplitude of said third and fourth D.C. signals, and means for combining said first, third and fourth envelope-forming modulated A.C. signals to form a composite envelope-forming signal varying in envelope peak-to-peak amplitude/time as a function of the composite amplitude of said first, third and fourth signals and the composite outline of said first composite and further composite areas, for feeding to an image-forming device to effect envelope formation as a function thereof.

39. Image signal forming means, comprising means for forming time-overlapping first and second D.C. signals at least one of which varies and which together with their respective opposite mirror image signals are representative in amplitude/time of a first composite area desired to be imaged, means for in-phase combining each of said time-overlapping first and second D.C. signals with a respective mutually in-phase A.C. signal having a frequency repetition rate such that a plurality of cycles occur within the time duration of a single occurrence of said first and second D.C. signals to modulate the respective said mutually in-phase A.C. signals to form respective first and second in-phase envelope-forming signals each of which comprises a plurality of in-phase cycles the successive cycles of which respectively vary in envelope peak-to-peak amplitude/time as a function of the respective amplitude/time of said first and second D.C. signals, and means for combining said first and second envelope-forming signals to form a composite envelope-forming signal varying in envelope peak-to-peak amplitude/time as a function of the composite amplitude/time of said first and second envelope-forming signals and the composite outline of said first composite area, for feeding to an image-forming device to effect envelope image formation as a function thereof.

40. Image signal forming means, comprising means for forming time-overlapping first and second D.C. signals at least one of which varies and which together with their respective opposite mirror image signals are representative in amplitude/time of a first composite area desired to be imaged, means for in-phase combining each of said time-overlapping first and second D.C. signals with a respective mutually in-phase A.C. signal having a frequency repetition rate such that a plurality of cycles occur within the time duration of a single occurrence of said first and second D.C. signals to modulate the respective said mutually in-phase A.C. signals to form respective first and second time-overlapping in-phase envelope-forming signals each of which comprises a plurality of in-phase cycles the successive cycles of which respectively vary in envelope peak-to-peak amplitude/time as a function of the respective amplitude/time of said first and second D.C. signals, means for combining said first and second envelope-forming signals to form a composite envelope-forming signal varying in envelope peak-to-peak amplitude/time as a function of the composite amplitude/time of said first and second envelope-forming signals and the composite outline of said first composite area, for feeding to an image-forming device to effect envelope image formation as a function thereof, means for forming third and fourth D.C. signals which together with their respective opposite mirror image signals are representative in amplitude/time of a further composite area desired to be imaged, and means for combining said third and fourth D.C. signals to form a composite D.C. signal which together with its opposite mirror image signal is representative in amplitude/time of the composite outline of said further composite area, and which may be employed to modulate an A.C. signal similarly to the modulation by said first and second D.C. signals.

41. A method of image signal formation, comprising forming a composite peak-to-peak outline envelope-forming image-representative modulated A.C. carrier signal for feeding to one X-Y coordinate input of an X-Y coordinate trace display device having X and Y displacement inputs, from two time-overlapping variable D.C. component-area-representative signals by modulating at least one A.C. carrier signal having a plurality of cyclical repetitions during a given occurrence of said D.C. component-area-representative signals, said modulating being effected as a function of said two time-overlapping D.C. component-area-representative signals, and forming a trace displacement ramp sweep signal having a ramp duration during one occurrence of at least as long as the duration of said composite envelope-forming image-representative modulated A.C. carrier signal for one complete area-representative signal representation by said image-representative modulated A.C. carrier signal, for feeding to the other of said two X and Y displacement inputs of a said X-Y coordinate trace display device.

42. A method according to claim 41, said forming of said composite envelope-forming image-representative signal being effected by formation of and adding together two time-overlapping DC signals which together with their respective opposite mirror image signals form said two time-overlapping component-area representative signals to form a composite DC signal, and modulating an AC carrier signal as a function of said composite DC signal.

43. A method according to claim 41, said forming of said composite envelope-forming image-representative signal being effected by forming two time-overlapping envelope-forming carrier signals which are modulated as a function of the outline of said two component areas.

44. A method according to claim 41, and selectively modifying said composite signal as a function of variation of the angle of view of a three-dimensional object, an outline portion of which is represented by said composite signal.

45. A method according to claim 44, said selective modifying being effected as a function of an applicable Euler transform.

46. A method according to claim 41, forming a trace image having a trace displaced as a function of time and as a function of and reflecting the amplitude variations of said composite envelope-forming signal.

47. The method of forming an image-representing signal, comprising
- forming two modulated A.C. carrier envelope-forming signals in quadrature phase relation, and the envelopes of which represent respectively two viewed areas of a common three-dimensional space zone at 90° angles of view,
- forming a common time ramp reference signal for use in common with both of said envelope-forming signals to enable formation of an image selectively corresponding to the envelope amplitude of one or both of the respective two envelope-forming signals and associated areas,
- varying one of said envelope-forming signals in envelope amplitude as a function of time and within the time span of said common time ramp reference signal, said varying of said one envelope-forming signal including varying said signal through multiple repetitive cycles within the time span of one occurrence of said common time ramp reference signal and further varying the amplitude of individual multiple cycles according to a portion of the outline of one of said areas of said common three-dimensional space zone,
- and forming a trace image having a trace displaced as a function of time and as a function of and reflecting the peak-to-peak amplitude of said two envelope-forming signals.

48. The method according to claim 47, further comprising
- transform combination of said envelope-forming signals and said ramp reference signal according to Euler transforms for enabling apparent image rotation.

49. The method according to claim 48, further comprising
- forming an image and displaying said image as a function of said transformed combination of said envelope-forming signals.

50. The method according to claim 47, including
- varying both of said envelope-forming signals as a function of time and within the time span of said common time ramp reference signal.

51. Image signal-forming appartus, comprising
- means for forming two modulated A.C. carrier envelope-forming signals in quadrature phase relation and the envelopes of which represent respectively two viewed areas of a common three-dimensional space zone at 90° angles of view,
- means for forming a common time ramp reference signal for use in common with both of said envelope signals to enable formation of an image selectively corresponding to the envelope amplitude of one or both of the respective two envelope-forming signals and associated areas,
- one of said envelope-forming signals varying in envelope-forming amplitude as a function of time and within the time span of said common time ramp reference signal, and varying through multiple repetitive cycles within the time span duration of one occurrence of said common time ramp reference signal and which repetitive cycles vary in amplitude according to a portion of the outline of one of said areas of said common three-dimensional zone.

52. Apparatus according to claim 51, further comprising
- means for transform combination of said envelope-forming signals and said ramp reference signal according to Euler transforms for enabling apparent image rotation.

53. Apparatus according to claim 52, further comprising
- means for forming trace image and displaying said image as a function of said transformed combination of said envelope-forming signals.

54. The apparatus according to claim 51, further comprising
- one of said envelope-forming signals being formed as a function of two component area representing signals 55. Apparatus according to claim 51, including
- both of said envelope-forming signals varying in peak-to-peak amplitude as a function of time and within the time span of said common time ramp reference signal.

56. The method of image signal formation, comprising
- forming a composite envelope-forming image-representative modulated A.C. carrier signal from two time-overlapping component-area-representative in-phase A.C. carrier signals representing, and the amplitudes of which are a function of a composite area desired to be imaged,
- one of said component-area-representative signals being a modulated A.C. carrier signal varying in modulated A.C. envelope amplitude, and said composite modulated A.C. carrier signal varying in peak-to-peak envelope amplitude over a single image-forming period as a function of the varying respective bounding outline portions of said composite area desired to be imaged,
- and forming a common ramp reference signal having a ramp duration during one occurrence of at least as long as the duration of said composite envelope-forming image-representative modulated A.C. carrier signal for one complete area-representative signal representation by said composite modulated A.C. carrier signal for use as a concurrent X-Y coordinate input to an X-Y coordinate display device in combination with said composite envelope-forming modulated A.C. signal to enable formation of a trace signal display displaced as a function of the respective amplitudes of both such concurrent X-Y inputs.

57. The method according to claim 56,
- the other of said two component-area-representative signals being a modulated envelope-forming signal of substantially constant modulation amplitude during a portion of said one varying modulation amplitude signal.

58. The method according to claim 57,
- said other of said two component-area-representative signals being of substantially constant modulation amplitude during the effective full single-image-forming time duration of said one amplitude modulation varied signal.

59. Apparatus for image signal formation comprising
- means for forming a composite envelope-forming image-representative modulated A.C. carrier signal train of multiple selectively varying-amplitude A.C. carrier signal cycles by algebraic addition of two time-overlapping component-area-representative signals which represent adjoining areas desired to be simultaneously imaged, said means for forming said composite envelope-forming image-representative modulated A.C. carrier signal train including means for formation of and adding together two time-overlapping D.C. signals which together with their respective opposite mirror image signals form said two time-overlapping component-area-representative signals, to form a composite D.C. signal, and means for modulating an A.C. carrier signal as a function of said composite D.C. signal.

60. Apparatus according to claim 59,
and means for selectively modifying said composite signal as a function of variation of the angle of view toward said two areas,
said means for selectively modifying said selected signal including means for selectively modifying said signal as a function of an applicable Euler transform.

61. Apparatus according to claim 59,
and means for forming a trace image having a trace displaced as a function of time and as a function of and reflecting the amplitude variations of said composite envelope-forming signal.

62. Apparatus for image signal formation comprising
means for forming a composite envelope-forming image-representative modulated signal train of multiple selectively varying amplitude cycles by algebraic addition of two time-overlapping component-area-representative signals which represent adjoining areas desired to be simultaneously imaged,
said means for forming said composite envelope-forming image-representative signal including means for forming and algebraically adding two time-overlapping modulated envelope-forming A.C. carrier signal trains modulated as a function of said two adjoining component areas,
said modulated envelope-forming A.C. carrier signal trains comprising respectively said two component area image-representative signals,
and means for forming an image trace displacement ramp signal having a single cycle ramp duration at least as long as one complete said composite envelope-forming image-representative modulated A.C. carrier signal train.

63. Apparatus according to claim 62,
and means for selectively modifying said composite signal as a function of variation of the angle of view toward said two areas,
said means for selectively modifying said selected signal including means for selectively modifying said signal as a function of an applicable Euler transform.

64. Apparatus according to claim 62,
and means for forming a trace image having a trace displaced as a function of time as a function of and reflecting the amplitude variations of said composite envelope-forming signal.

65. Image signal forming means, comprising
means for forming a first analog envelope-forming signal, the effective envelope amplitude of which varies in time as a function of a sectional outline bounding a portion of a first area desired to be imaged,
means for forming a second analog envelope-forming signal in time-overlapping timed phase relation with said first signal and the effective envelope amplitude of which varies in time as a function of a further sectional outline bounding a portion of a respective second area desired to be simultaneously imaged,
means for adding said first and second signals and for forming as a function thereof a composite envelope-forming image-forming signal the effective envelope of which varies in time as a function of both of said first and second areas,
and means for forming a common time reference ramp trace-sweep signal in time-overlapping relation with, and for use in common with, said composite envelope-forming signal to effect trace movement in a direction transverse to trace movement effected by said composite envelope-forming signal,
said means for adding said first and second signals and for forming as function thereof a composite envelope-forming image-forming signal including means effective to form said composite envelope image-forming signal as a modulated A.C. carrier image-forming signal varying in peak-to-peak A.C. envelope amplitude during a single occurrence of said common time reference trace sweep signal.

66. Image signal forming means according to claim 65,
and means for forming a trace image on an X-Y display including means for effecting trace displacement in one direction as a function of said common time reference trace sweep signal, and means for effecting trace displacement in a direction transverse to said first direction as a function of amplitude of said composite A.C. carrier envelope-forming signal during concurrent occurrence of said modulated A.C. carrier envelope-forming signal to thereby form a visual envelope trace image having an area bounding envelope outline of which a portion varies with and conforms to said combined areas.

* * * * *

UNITED STATES PATENT AND TRADEMARK OFFICE
CERTIFICATE OF CORRECTION

PATENT NO. : 4,162,492

DATED : July 24, 1979

INVENTOR(S) : Robert E. Jones, Jr.

It is certified that error appears in the above-identified patent and that said Letters Patent are hereby corrected as shown below:

Column 1, Line 47, change "stimulation" to ---simulation--- .
Column 2, Line 21, after "image" insert ---signal--- ,
Column 2, Line 43, change "lissojous" to ---lissajous--- ,
Column 2, Line 44, change "addtion" to ---addition--- .
Column 4, Line 55, change "fuseage" to ---fuselage--- ,
Column 4, Line 63, change "stimulation" to ---simulation--- .
Column 5, Line 56, change "harominc" to ---harmonic--- .
Column 6, Line 3, change "as" to ---is--- ,
Column 6, Line 9, change "toggles" to ---toggled--- ,
Column 6, Line 17, after "switching" insert ---,--- .
Column 7, Line 12, after "sufficiently" insert ---significant--- ,
Column 7, Line 21, change "the" to ---they--- ,
Column 7, Line 56, change "C1" to ---C 1--- ,
Column 7, Line 58, change "unitl" to ---until--- .
Column 8, Line 10, change "I1" to ---I 2--- ,
Column 8, Line 59, change "T-6" to ---T-6$^{-}$--- ,
Column 8, Line 67, change "T-6+" to ---T-6$^{+}$--- .
Column 9, Line 29, change "multipliers" to ---its--- .
Column 12, Line 44, after "8.23V" delete ")" ,
Column 12, Line 50, change "viwed" to ---viewed--- .
Column 13, Line 9, change "NcGraw-Hill" to ---McGraw-Hill--- .
Column 14, Line 47, change "rammp" to ---ramp--- ,
Column 14, Line 49, change "T-50" to ---T-20--- .
Column 16, Line 21, change "of" to ---off--- ,
Column 16, Line 37, change "Signal" to ---signal--- .
Column 17, Line 15, change "particularly" to ---particular--- .
Column 19, Line 12, change "transformatins" to ---transformations--- ,
Column 19, Line 65, delete "]" .
Column 20, in the second equation change "θ" to ---$\phi$--- first and fourth occurrences, so the equation will read as follows:

$$U_V = \sin\phi \, [+\sin\theta \, (\cos\alpha\cos\psi + \sin\alpha\sin\gamma\sin\psi) - \cos\theta \, (\sin\alpha\cos\psi - \cos\alpha\sin\gamma\sin\psi)] + \cos\phi \, \cos\gamma\sin\psi$$

UNITED STATES PATENT AND TRADEMARK OFFICE
CERTIFICATE OF CORRECTION

PATENT NO. : 4,162,492

DATED : July 24, 1979

INVENTOR(S) : Robert E. Jones, Jr.

It is certified that error appears in the above-identified patent and that said Letters Patent are hereby corrected as shown below:

Column 20, in the third equation change "$\theta$" to ---$\phi$--- first and fourth occurrences, so the equation will read as follows:

---$T_V = \sin \phi [-\sin \theta \cos \alpha - \cos \theta \cos \gamma \cos \alpha ]$ $+ \cos \phi \sin \gamma$ --- , Column 20, in the fourth equation change "$\theta$" to ---$\phi$--- first and fourth occurences, so the equation will read as follows:

---$S_V = \sin \phi [-\sin \theta (\cos \alpha \sin \psi - \sin \alpha \sin \gamma \cos \psi)$ $+ \cos \theta (\sin \alpha \sin \psi + \cos \alpha \sin \gamma \cos \psi)] + \cos \phi \cos \gamma \cos \psi$---

Column 23, Line 29, change "respctive" to ---respective--- ,

Column 23, Line 41, change "with" to ---within--- .

Signed and Sealed this

Eleventh Day of November 1980

[SEAL]

Attest:

SIDNEY A. DIAMOND

Attesting Officer

Commissioner of Patents and Trademarks